United States Patent [19]
Tamura et al.

[11] Patent Number: 5,325,231
[45] Date of Patent: Jun. 28, 1994

[54] MICROSCOPE ILLUMINATING APPARATUS

[75] Inventors: Keisuke Tamura, Tokyo, Japan; Kazuhiko Osa, Nineola, N.Y.; Takashi Nagano, Tokyo, Japan

[73] Assignee: Olympus Optical Co., Ltd., Tokyo, Japan

[21] Appl. No.: 854,333

[22] Filed: Mar. 19, 1992

[30] Foreign Application Priority Data

| | | |
|---|---|---|
| Mar. 22, 1991 [JP] | Japan | 3-083461 |
| Apr. 10, 1991 [JP] | Japan | 3-077881 |
| Jul. 24, 1991 [JP] | Japan | 3-184851 |

[51] Int. Cl.$^5$ .......................... G02B 21/06; G02B 7/24
[52] U.S. Cl. .................................... 359/387; 359/381
[58] Field of Search ............................ 359/387, 381

[56] References Cited

U.S. PATENT DOCUMENTS

| | | | |
|---|---|---|---|
| 1,951,636 | 3/1934 | Straubel | 359/387 |
| 3,930,713 | 1/1976 | Stankewitz et al. | 359/387 |
| 4,127,318 | 11/1978 | Determann et al. | 359/387 |
| 4,160,578 | 7/1979 | Gottlieb et al. | 359/387 |
| 4,186,993 | 2/1980 | Shimizu et al. | 359/387 |
| 4,329,014 | 5/1982 | Reinheimer et al. | 359/387 |
| 4,475,796 | 10/1984 | Kimura | 359/387 |
| 4,487,486 | 12/1989 | Hayasaka | 359/387 |
| 4,626,079 | 12/1986 | Nakamura et al. | 359/387 |
| 4,687,304 | 8/1987 | Piller et al. | 359/387 |
| 5,729,070 | 3/1988 | Chiu | |

FOREIGN PATENT DOCUMENTS

| | | | |
|---|---|---|---|
| 2301597 | 7/1974 | Fed. Rep. of Germany | 359/387 |
| 3100662 | 11/1981 | Fed. Rep. of Germany | 359/387 |
| 18-21353 | 9/1943 | Japan. | |
| 50-73446 | 6/1975 | Japan. | |
| 55-140811 | 11/1980 | Japan. | |
| 61-270721 | 12/1986 | Japan. | |
| 2-97909 | 4/1990 | Japan. | |
| 2168167 | 6/1986 | United Kingdom. | |

OTHER PUBLICATIONS

Patent Abstracts of Japan, vol. 014, No. 565 (P-1143) Dec. 17, 1990 & JP-A-22 42 214 (Nippon Telegraph & Telephone Corp.), Sep. 26, 1990.
Patent Abstracts of Japan, vol. 012, No. 399 (P-775) Oct. 24, 1988 & JP-A-63 139 316 (Olympus Optical Co., Ltd.(, Jun. 11, 1988.
Patent Abstracts of Japan, vol. 016, No. 407 (P-1411) Aug. 27, 1992 & JP-A-41 36 807 (Olympus Optical Co., Ltd.), May 11, 1992.
Patent Abstracts of Japan, vol. 16, No. 309 (P-1382) Jul. 8, 1992 & JP-A-40 86 614 (Olympus Optical Co., Ltd.), May 19, 1992.

*Primary Examiner*—Jon W. Henry
*Attorney, Agent, or Firm*—Frishauf, Holtz, Goodman & Woodward

[57] ABSTRACT

A microscope illuminating apparatus includes a light-shielding tube surrounding an objective lens, detachably mounted on a revolver of a system microscope in order to guide illumination light to irradiate an observation field, thus separating an illumination optical path and an observation optical path. An annular illuminating section serving as a light source of the illumination light is provided at a position to oppose an end portion aperture of the illumination optical path in the revolver.

11 Claims, 21 Drawing Sheets

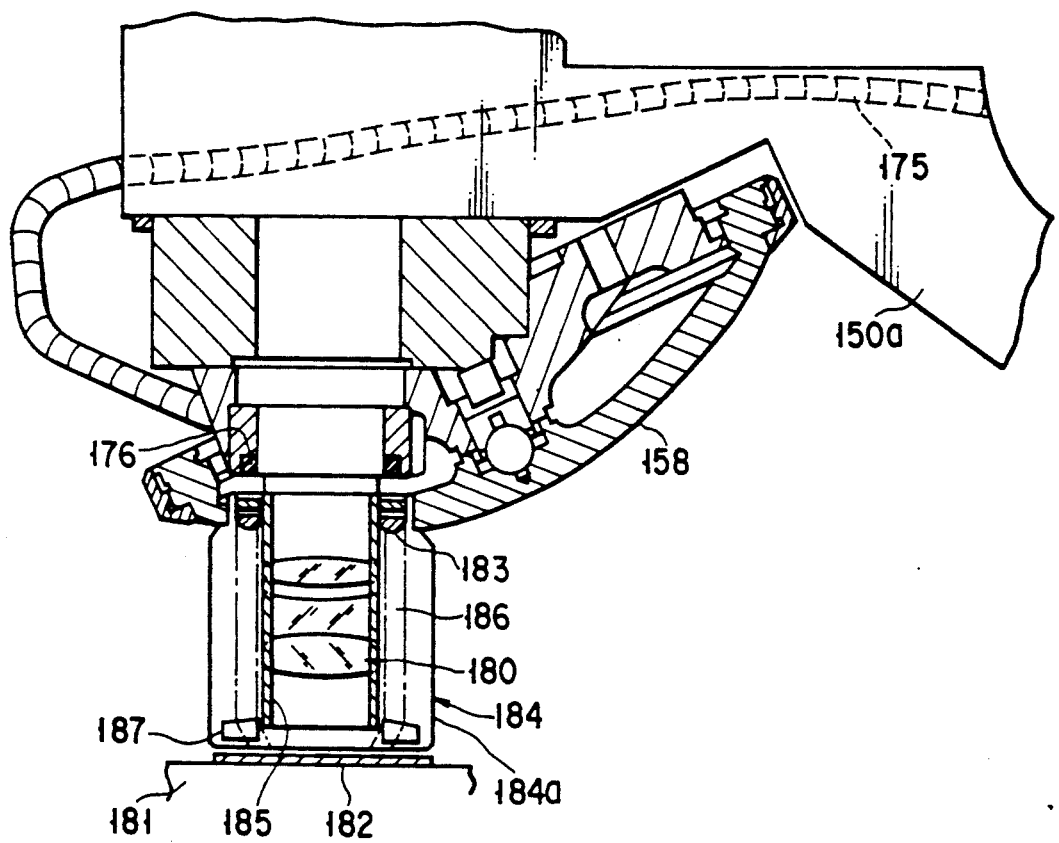
F I G. 20

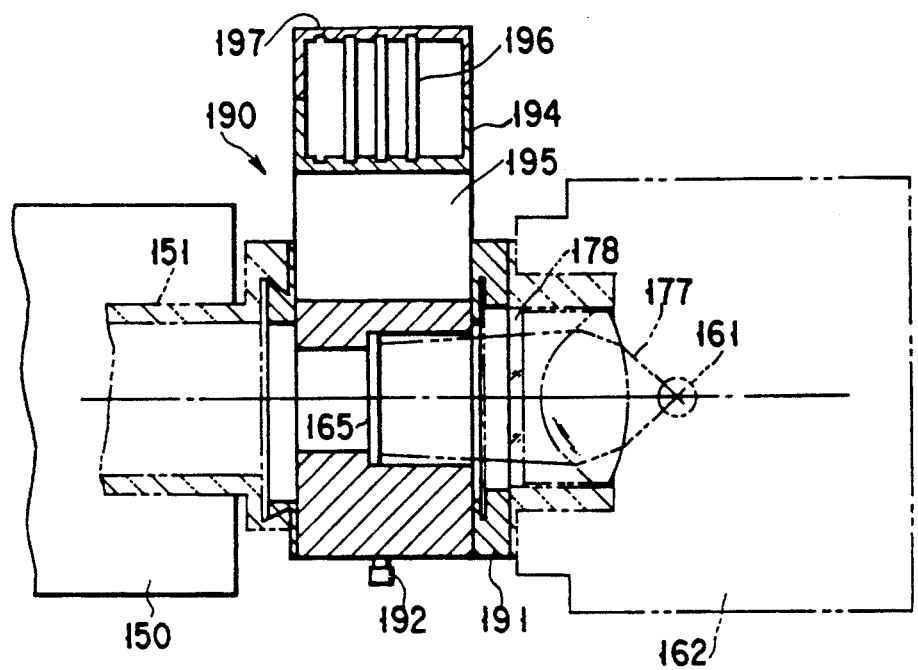
F I G. 21A
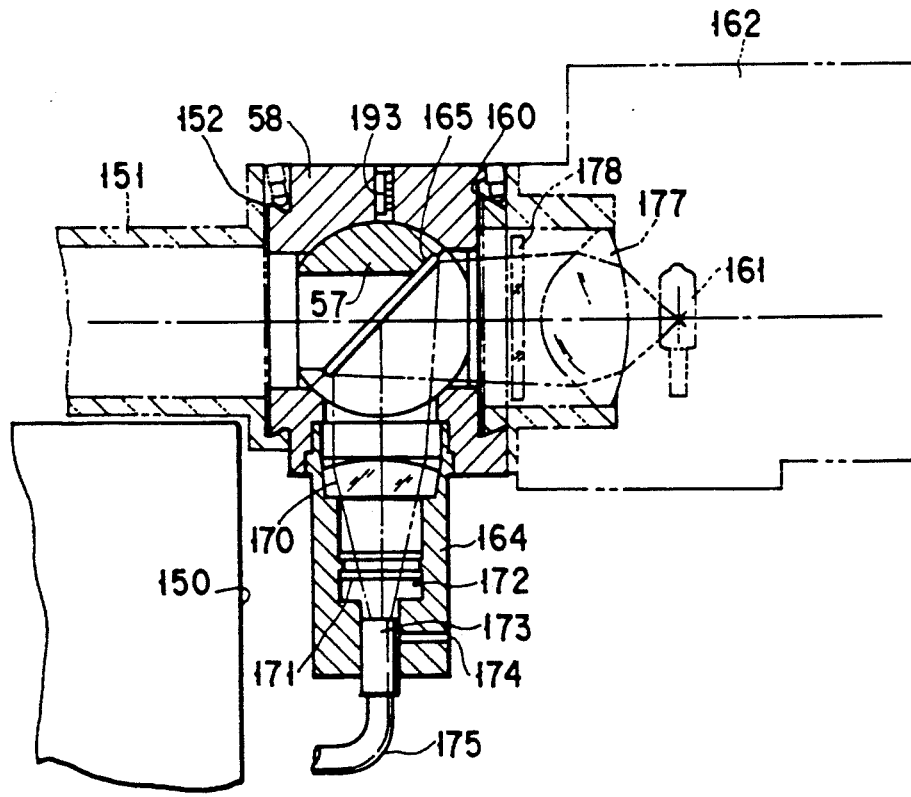
F I G. 21B

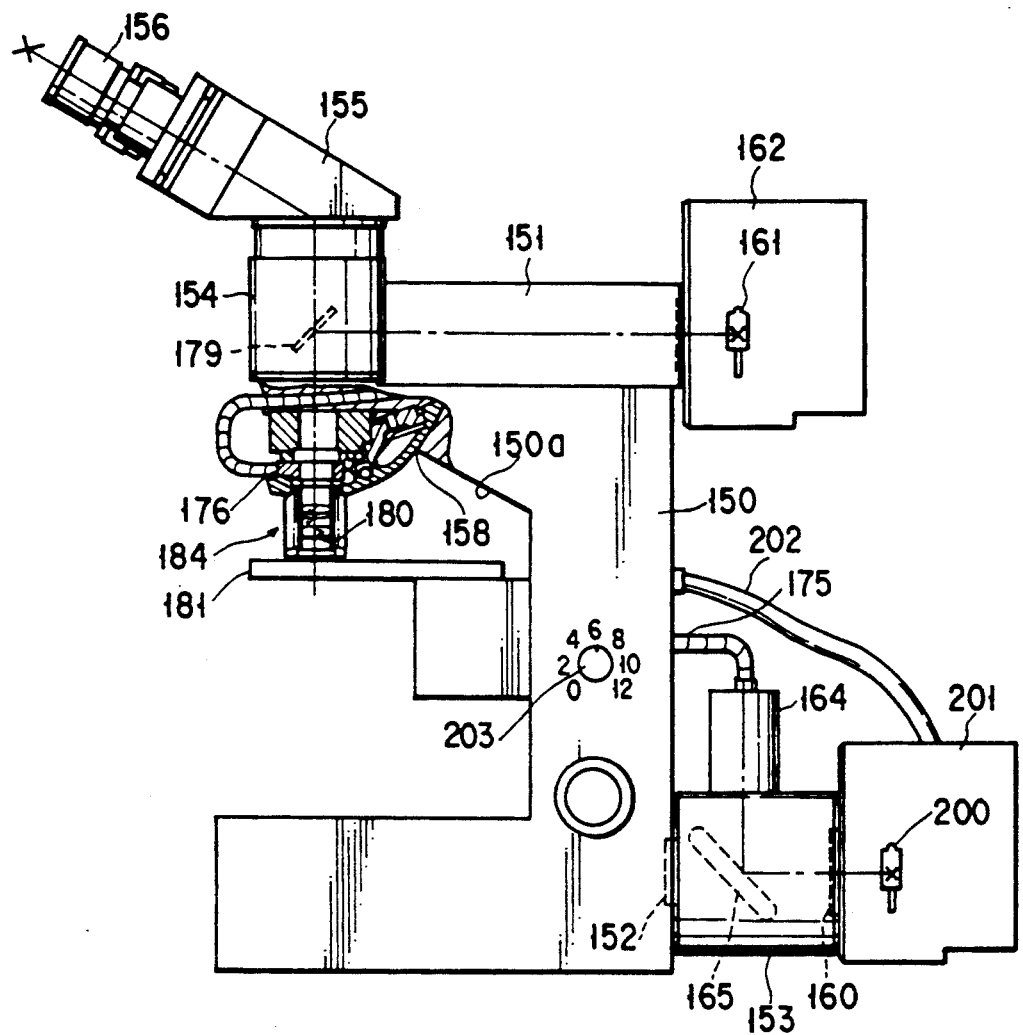
F I G. 22

MICROSCOPE ILLUMINATING APPARATUS

BACKGROUND OF THE INVENTION

1. Field of the Invention

The present invention relates to a microscope illuminating apparatus used in, e.g., a system microscope.

2. Description of the Related Art

Conventionally, in a system microscope in which an attachment and various types of optical members are present in its observation optical system in accordance with the content of microscopic observation, an infinity correction observation optical system is used so that the optical members do not adversely affect the magnification and the image forming characteristics.

FIG. 24 shows a reflected illuminating apparatus applied to a system microscope having an infinity correction observation optical system.

Referring to FIG. 24, an objective lens 1 is mounted on a revolver 2 of the microscope through an objective lens outer frame 1a. An objective lens system 3 constituting part of the infinity correction observation optical system is provided at the central portion of the objective lens 1. A lens frame 3a for separating dark field illumination light and bright field illumination light is provided on the outer circumference of the objective lens system 3. An annular condenser lens 4 is provided on the outer circumference of the distal end portion of the objective lens system 3. An annular mirror 5 having a hole for deflecting illumination light toward the condenser lens 4 is arranged above the objective lens system 3. A light-shielding tube 6 is arranged at the central portion of the holed mirror 5 to be coaxial with the observation optical axis. The light-shielding tube is arranged to prevent annular illumination light from mixing in the observation optical path. Light emitting from a light source 7 is collimated to illumination light comprising parallel rays by illumination lenses 8 to 10 and is incident on the holed mirror 5. Since the optical members, e.g., an attachment and the half mirror described above are interposed between the objective lens system 3 and the light-shielding tube 6, a sufficient distance is set between the objective lens system 3 and the light-shielding tube 6. A light-shielding tube 12 for separating an illumination optical path and the observation optical path is provided between the objective lens system 3 and the light-shielding tube 6.

The objective lens system 3 described above apparently serves as a condenser lens during reflected bright field illumination.

In the reflected illuminating apparatus having the above arrangement, the illumination light emitted from the light source 7 is set to parallel illumination light by the illumination lenses 8 to 10 and is incident on the holed mirror 5. Annular illumination light reflected by the holed mirror 5 is incident on the annular condenser lens 4 through the illumination optical path and is condensed on an object surface O. Light reflected by the object surface O is incident on a focusing lens (not shown) through the objective lens system 3 and the light-shielding tube 6. When the light reflected by the object surface O passes through the light-shielding tube 6, generation of flare in the light-shielding tube 6 is prevented by a stop 11 provided in the light-shielding tube 6.

In the reflected illuminating apparatus described above, however, the numerical aperture must be set large to improve the resolution of the objective lens system 3 and the distance between the objective lens system 3 and the stop 11 must be set long to interpose the attachment in the observation optical system. This leads to a lack in quantity of light around the observation field.

This problem will be discussed with reference to FIG. 25. Note that FIG. 25 schematically shows the infinity correction observation optical system between the object surface O and the stop 11 of the light-shielding tube 6.

In the infinity correction observation optical system in FIG. 25, the ray of light emitting from a center P2 of the observation field propagates in parallel with the optical axis, as indicated by $v1$ to $v3$, while the ray of light emitting from a periphery P1 of the observation field propagates obliquely to the optical axis, as indicated by $v4$ to $v6$. Therefore, if the stop 11 is present halfway, although the ray from the center P2 of the observation field is entirely transmitted through it, the rays from the periphery P1 from the observation field may be cut by the stop 11, and the farther from the center of the observation field, the larger the attenuation amount of the quantity of light, resulting in a dark image. This tendency becomes strong as the stop position becomes farther as from a to b. A similar lack in quantity of light also occurs when the numerical aperture of the objective lens is increased.

This lack in quantity of light can be solved to a certain degree by widening the observation optical path. In the conventional reflected illuminating apparatus, however, since the annular illumination optical path and the observation optical path are separated by the light-shielding tube 12 in order to prevent mixing of the illumination light in the observation optical path, the width of the observation optical path is limited, and it is difficult to widen the observation optical path.

Optical microscopes are widely utilized in the field of biology as they can observe a live specimen. Above all, a dark field microscope has the features of the optical microscope while it has a resolving power greatly higher than that of the optical microscope. The dark field microscope can thus detect a very small molecule, e.g., a molecule having a size of several tens of nm and is effective in examining the dynamic behavior of, e.g., various small molecules constituting a small organ in a cell.

FIG. 26 shows an illuminating apparatus of a conventional transmitted dark field microscope having an arrangement as follows.

A stage 63 for placing a specimen 62 thereon is supported on a microscope frame 61 to be movable along an observation optical axis 64. An objective lens 65 for enlarging and observing the specimen 62 is fixed above the frame 61 along the observation optical axis 64. A lamphouse 67 housing an illumination light source 66 is fixed below the frame 61. A beam emitted from the light source 66 is guided to a reflecting mirror 71 through a plurality of filters 69 and a field stop 70 sequentially, and the beam reflected by the reflecting mirror 71 is guided toward the specimen 62.

The filters 69 can be inserted in and removed from the illumination optical path in order to adjust the brightness of the illumination light source 66 and the nature of the light, e.g., color.

The arrangement described above is the same as that of an ordinary microscope for transmitted illumination field observation. In addition to this arrangement, the dark field microscope needs a dark field condenser 72 as follows. That is, the dark field condenser 72 must be constructed so that it has a numerical aperture larger than that of the objective lens 65 and can illuminate the specimen 62 such that the illumination light will not be directly incident on the objective lens 65 and such that only the light scattered by the specimen 62 is incident on the objective lens 65.

For this purpose, the dark field condenser 72 has an annular condenser case 73, a dark field condenser lens 74 fixed on the end portion of the aperture of the condenser case 73 and having first and second spherical reflecting surfaces 74a and 74b, and a ring slit 75 fixed inside the condenser case 73 to be close to the condenser lens 74. The dark field condenser 72 having this arrangement is supported by and fixed on a condenser carrier 76 which is supported to be movable along the observation optical axis 64 and adjustable in the vertical direction with respect to the observation optical axis 64. The condenser carrier 76 is mounted on the stage 63.

Thus, the illumination light emitted from the illumination light source 66 passes through the ring slit 75 to become annular, is directed outward by the first reflecting surface 74a of the dark field condenser lens 74, and is then directed inward by the second reflecting surface 74b of the condenser lens 74. As a result, the illumination light is not directly incident on the objective lens 65 but is radiated on the specimen 62. In this case, of the transmitted bright field beams, only the beam which has passed through the ring slit 75 serves as the dark field illumination beam.

This dark field microscope has problems as follows:
(1) Since only the beam, of the illumination beams, that has passed through the ring slit 75 serves as the dark field illumination beam, the illumination efficiency is very low, and accordingly the dark field illumination becomes very dark.
(2) To perform switching between the dark field illumination and the bright field illumination, the entire dark field condenser 72 must be exchanged, and after the exchange, optical adjustment of the condenser 72, i.e., centering of the specimen 62 and adjustment of the distance between the specimen 62 and the condenser lens 74 must be performed every time illumination is switched.
(3) The beam passing through the ring slit 75 of the condenser 72 for the dark field illumination is the beam emerging from the periphery of the field stop 70, and in dark field observation, an operation for aperturing the field stop 70 needs to be performed.
(4) Since the quantity of light to be observed is largely changed after switching between the dark field the and bright field, the filters 69 for brightness control must be inserted or removed.

A microscope illuminating apparatus from which the problem (1) is solved is conventionally known, as described in Published Unexamined Japanese Patent Application No. 55-140811.

This microscope illuminating apparatus has a light source remote from a precious stone to be examined, a glass fiber optical guide member extending to an annular endpiece, and a reflecting mirror mounted on the endpiece, and has a function as follows. That is, light emitted from the light source is gathered by the glass fiber bundle. The fiber constituting the bundle is dispersed in the endpiece so as to transmit the annular light to the upper surface of the endpiece. Light emerging through the endpiece is focused by the reflecting mirror and is radiated on the precious stone.

Hence, although this known example can prevent dark field illumination of problem (1), the remaining problems (2), (3), and (4) cannot be solved.

Recently, in reflected dark field observation, a method having an optical fiber bundle in order to perform illumination having a small variation with a large illuminance is disclosed in the specification of Japanese Patent Application No. 3-77881. According to this method, an annular optical fiber 100 is detachably formed on a revolver 101, and light emerging from the optical fiber 100 is supplied to an objective lens 102 as dark field illumination light, as shown in FIGS. 27 and 28. Light-shielding tubes 103a and 103b for separating the dark field illumination light and the observation light are fixed in the revolver 101 and the objective lens 102, respectively, by three stays 104a, 104b, and 104c shown in FIG. 28.

Two end portions D and F of each of the three stays 104a, 104b, and 104c are arcuatedly formed, as shown by the stay 104a, and a central portion E connecting the two end portions D and F is linearly formed. As a result, when the illumination light is radiated on these linear portions, diffracted light is emerged from these portions. Because of the diffracted light and the shadows of the stays, the illumination light passing through the stays forms fringes of brightness and darkness. When a microscopic picture of reflected dark field observation is taken under this illumination light, especially in the case of high-magnification observation, a shag 108 is found at, e.g., an edge 107 portion of a pattern 106 of a silicon wafer 105, as shown in FIG. 17. As a result, it is difficult to observe a smaller object from an observation image or a picture with high accuracy.

SUMMARY OF THE INVENTION

It is an object of the present invention to provide a microscope illuminating apparatus which can prevent a lack in quantity of light around an observation field, which can perform bright incidence illumination having a small variation, and which has excellent compatibility with other system microscopes.

It is another object of the present invention to provide a microscope illuminating apparatus which can easily perform switching between dark field illumination and bright field illumination, and which has a high illumination efficiency in dark field illumination to perform bright dark field observation.

According to the present invention, since a light source for illumination is annularly provided in a revolver, the length of a light-shielding tube for separating an illumination optical path from an observation optical path can be reduced, and the lack in quantity of light around the observation field can be suppressed, so that it can be applied to various microscopic observations without impairing the convenience as the system.

According to the present invention, in dark field illumination it is possible to observe a smaller object with high accuracy.

Also, according to the present invention, switching between dark field illumination and bright field illumination can be easily performed by switching means or by making the best of one light source or the other light source, and the illumination efficiency in dark field illumination can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 20 is a sectional view schematically showing an annular light source section mounted on a bright/dark field revolver of the system microscope shown in FIG. 18A and an optical fiber tube connected to the annular light source section;

FIG. 21A is a sectional view schematically showing an arrangement of a slider applied to a microscope illuminating apparatus according to the twelfth embodiment of the present invention;

FIG. 21B is a side view of the portion shown in FIG. 21A;

FIG. 22 schematically shows an arrangement of a system microscope to which a microscope illuminating apparatus according to the thirteenth embodiment of the present invention is applied;

DETAILED DESCRIPTION OF THE PREFERRED EMBODIMENTS

The first embodiment of the present invention will be described below with reference to FIGS. 1A and 1B.

Figure 1A:
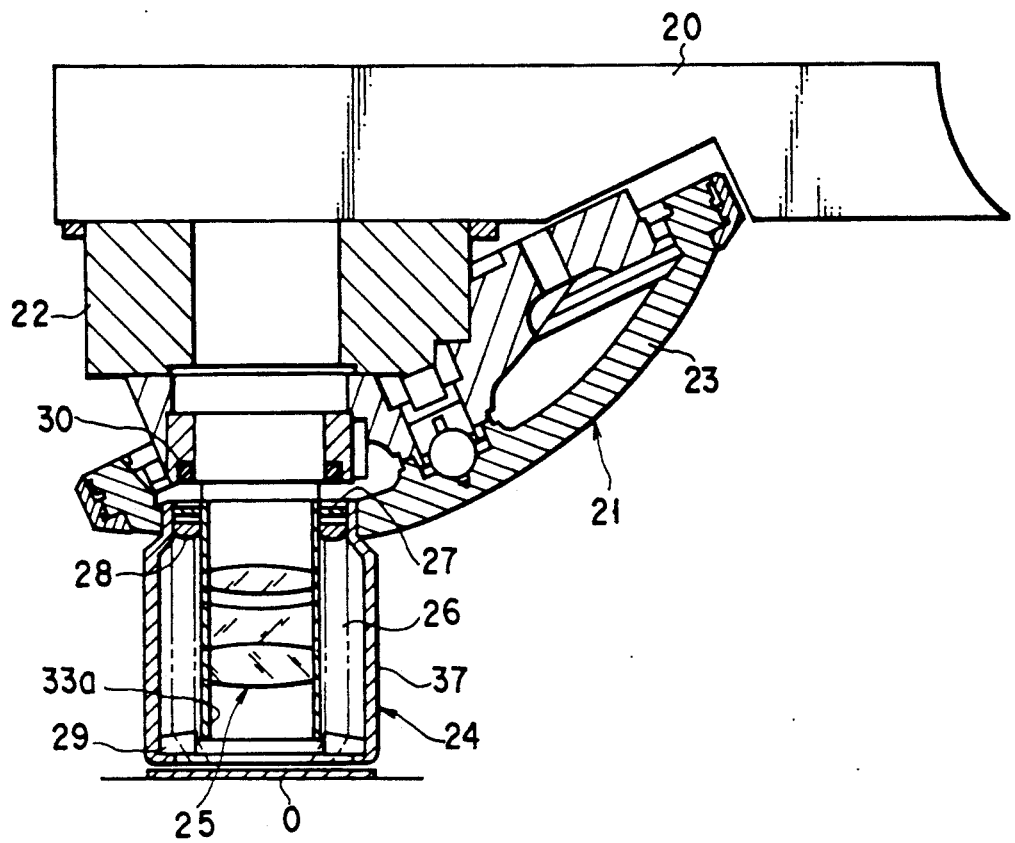
FIG. 1A is a sectional view schematically showing an arrangement of a microscope illuminating apparatus according to the first embodiment of the present invention.

As shown in FIG. 1A, in the first embodiment, an annular illuminating section 30 (to be described later) is provided in a revolver 21 detachably mounted on a microscope body 20.

A stationary side 22 of the revolver 21 is detachably mounted on the microscope body 21 through a dovetail groove or the like, and a cylindrical space coaxial with the optical axis of the observation optical system is formed in the stationary side 22. An objective lens 24 is detachably mounted on a movable side 23 of the revolver 21.

An objective lens system 25 is arranged in the objective lens 24 to be concentrical with the observation optical axis, and an illumination optical path 26 is formed around the objective lens system 25. An annular lens 28 for collimating illumination light to parallel rays is provided on the mounting side of the objective lens 24 which forms an annular aperture constituted by an outer frame 37 and a light-shielding tube (lens frame) 33a. An annular frost 27 is detachably disposed on the incident side of the annular lens 28. The frost 27 has a function of decreasing variation in illumination.

An annular condenser lens 29 for condensing the illumination light guided through the illumination optical path 26 on an object O is disposed on the distal end portion of the objective lens 24.

Figure 1B:
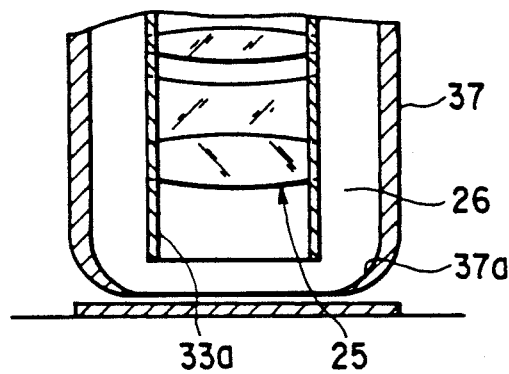
FIG. 1B is an enlarged sectional view showing an objective lens portion in which an annular concave reflecting mirror is provided on the distal end portion of its outer frame.

An annular concave reflecting mirror 37a can be preferably mounted on the pointed end portion of the outer frame 37 in place of the annular condenser lens 29, as shown in FIG. 1B.

The objective lens 24 is rotated together with the movable side 23 of the revolver 21 to be disposed as shown in FIG. 1A. The annular illuminating section 30 is provided on the stationary side 22 of the revolver 21 at a position opposing the annular aperture of the illumination optical path 26.

In this embodiment, the annular illuminating section 30 is disposed above the lens 24 to be very close to it, and the illumination light emerging from the annular illuminating section 30 is incident on the frost 27.

In this embodiment, the very short distance between the annular illuminating section 30 and the pointed end of the objective lens 24 suffices as the space needed for disposing the light-shielding tube 33a for preventing the illumination light from mixing in the observation optical path.

The illumination light incident on the frost 27 is collimated to parallel rays through the annular lens 28, and the parallel rays are condensed on the object O through the annular condenser lens 29.

In this manner, in the microscope illuminating apparatus of this embodiment, since the annular illuminating section 30 is provided in the revolver 21, the illuminating light source (i.e., the annular illuminating section 30) can be disposed very close to the objective lens 24. Accordingly, since the length of the light-shielding tube can be greatly reduced as compared to the conventional tube length, a lack in quantity of light around the observation optical system caused by the light-shielding tube can be effectively prevented.

Therefore, when the microscope illuminating apparatus according to this embodiment is used, an ideal system microscope can be configured, and the best performance can be obtained in various types of microscopic observations. Especially, in dark field microscopic observation, bright reflected dark field illumination having a small variation in brightness can be performed.

A microscope illuminating apparatus according to the second embodiment of the present invention will be described with reference to FIGS. 2, 3A, and 3B. In a description of this embodiment, the same portions as in the first embodiment are denoted by the same reference numerals, and a detailed description thereof is omitted.

In the microscope illuminating apparatus of the second embodiment, a space 32 (see FIG. 2) needed for inserting a Nomarski prism 36 (see FIG. 3B) used for differential interference microscopic observation is formed in a stationary side 22 of a revolver 21.

Figure 2:
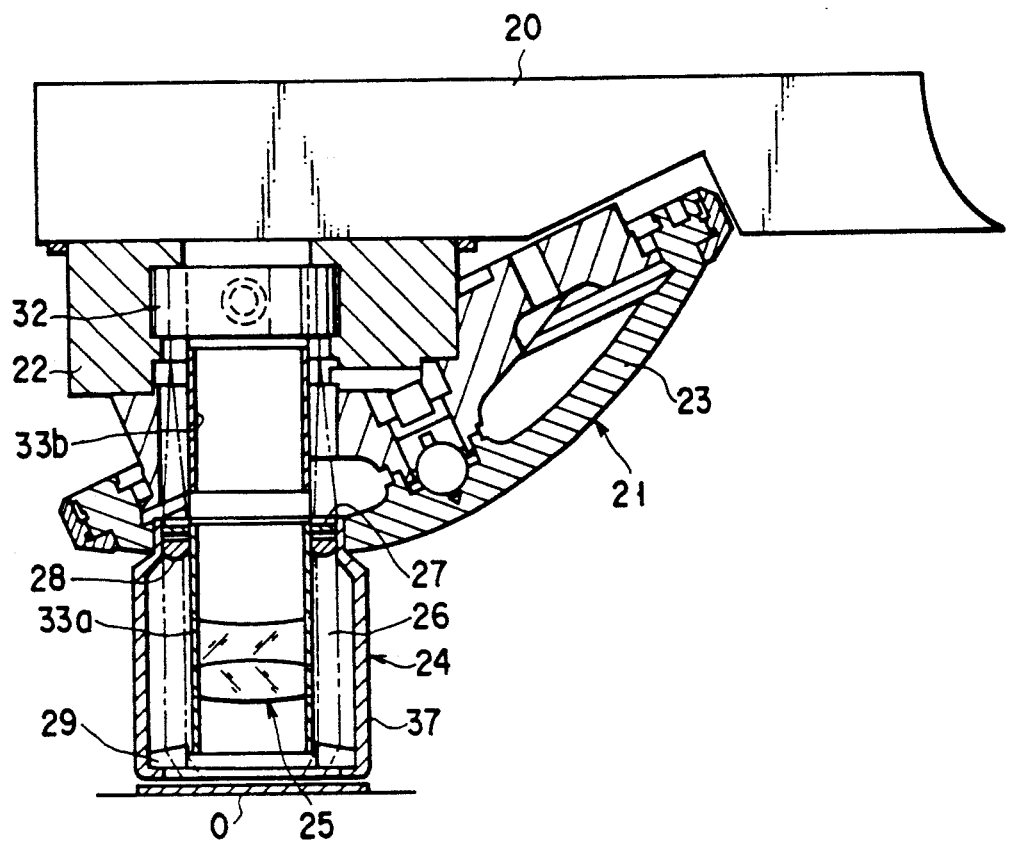
FIG. 2 is a sectional view schematically showing an arrangement of a microscope illuminating apparatus according to the second embodiment of the present invention.
Figure 3A:
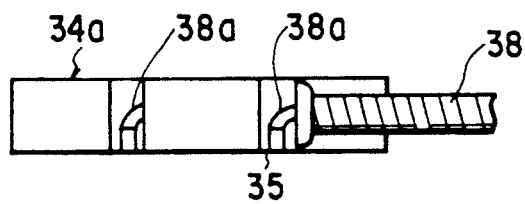
FIG. 3A is a sectional view of a slider incorporating an annular illuminating section.
Figure 3B:
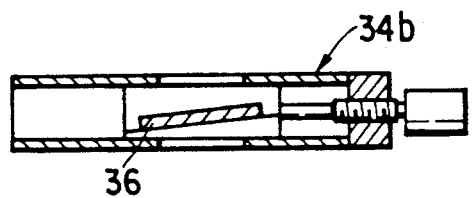
FIG. 3B is a sectional view of a slider incorporating a Nomarski prism.

As shown in FIGS. 2, 3A, and 3B, the system microscope to which the second embodiment of the present invention is applied has a slider space 32 in the space of the observation optical path in the stationary side 22 of the revolver 21 detachably mounted on a microscope body 20. A space between the slider space 32 and an annular lens 29 is separated into an observation optical path and an illumination optical path by light-shielding tubes 33a and 33b.

FIGS. 3A and 3B show arrangements of sliders 34a and 34b removably inserted in the space 32.

The slider (annular light source slider) 34a incorporates an annular illuminating section 35 formed by annularly arranging an exit end 38a of an optical fiber bundle 38. When this slider 34a is inserted in the space 32, the annular illuminating section 35 is disposed on the illumination optical path, and reflected dark field microscopic observation can be performed.

The slider (Nomarski prism slider) 34b incorporates the Nomarski prism 36. When the slider 34b is inserted in the space 32, the Nomarski prism 36 is disposed on the observation optical axis, and differential interference microscopic observation can be performed.

Since the sliders 34a and 34b have the same outer shape, they can share the space 32.

Differential interference microscopic observation and dark field microscopic observation are not performed simultaneously. In the former microscopic observation, therefore, the Nomarski prism slider 34b is inserted in the slider 32. In the latter microscopic observation, the annular light source slider 34a is inserted in the space 32.

In the microscopic illuminating apparatus of this embodiment, since the annular illuminating section 35 is disposed close to the objective lens 24 in this manner, the lack in quantity of light around the observation optical system can be prevented compared to the conventional apparatus. Since the space 32 formed in the stationary side 22 of the revolver 21 can be shared between the annular light source slider 34a and the Nomarski prism slider 34b, the manufacturing cost is low compared to a case in which an annular illuminating section is provided in the revolver 21. Compatibility with an attachment for other special microscopic observations can be maintained.

Figure 4:
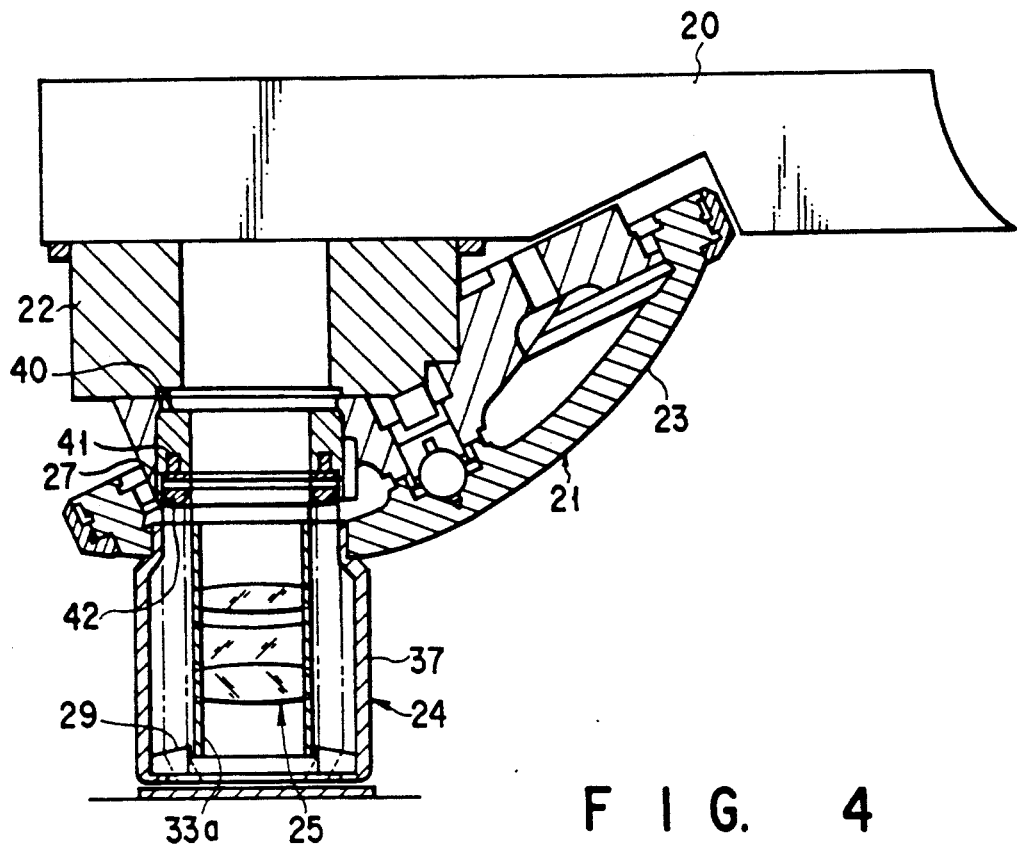
FIG. 4 is a sectional view schematically showing an arrangement of a microscope illuminating apparatus according to the third embodiment of the present invention.
Figure 5A:
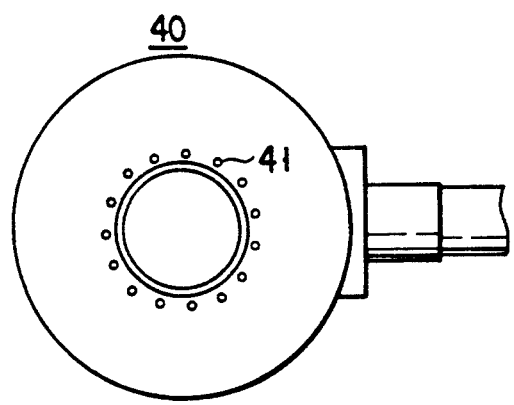
FIG. 5A is a plan view of an annular illuminating section applied to the apparatus shown in FIG. 4.
Figure 5B:
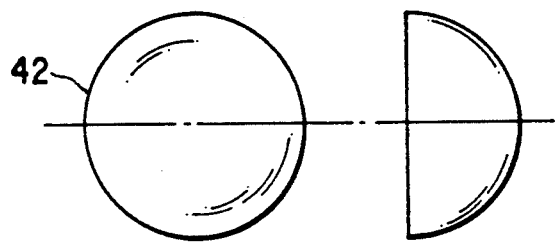
FIG. 5B is a plan view of a microlens applied to the apparatus shown in FIG. 4.

A microscope illuminating apparatus according to the third embodiment of the present invention will be described with reference to FIGS. 4, 5A, and 5B. Note that the same portions as in the first embodiment are denoted by the same reference numerals, and a detailed description thereof is omitted.

The basic arrangement of the third embodiment is the same as that of the first embodiment. The difference is that the annular lens 28 (see FIG. 1A) is replaced by a microlens 42 shown in FIG. 5B. An annular illuminating section 40 is constituted by a plurality of point light sources 41 disposed annularly at the same interval around an aperture having substantially the same diameter as that of the observation optical path. Microlenses 42 having the same number as that of the point light sources 41 are arranged below the annular illuminating section 40.

In the microscope illuminating apparatus of this embodiment, a lack in quantity of light around the observation field can be prevented in the same manner as in the embodiments described above. In the embodiments described above, the annular lens 28 has a lens effect in the meridional direction but not in the sagittal direction. Thus, inconvenience, e.g., flare, can be caused by the light in the sagittal direction. In the third embodiment, however, since the microlens 42 is used, the lens effect can be obtained both in the meridional and sagittal directions, and the illumination light can thus be effectively used.

A microscope illuminating apparatus according to the fourth embodiment of the present invention will be described with reference to FIGS. 6 and 7.

Figures 6, 7:
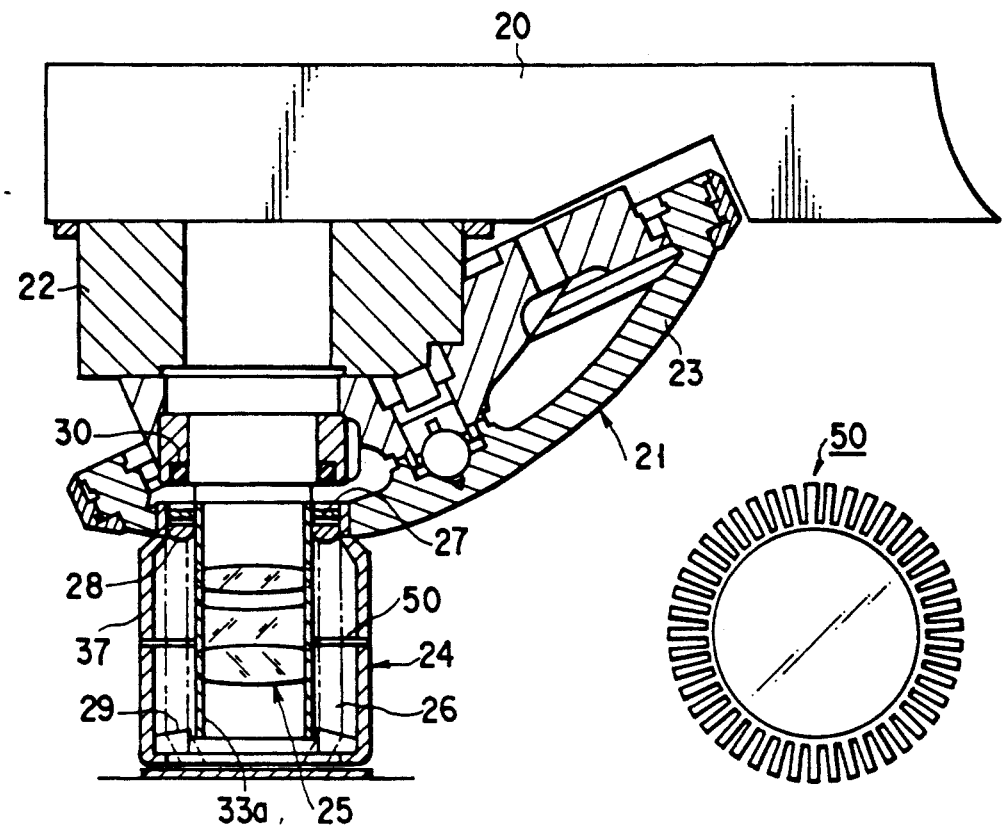
FIG. 6 is a sectional view schematically showing an arrangement of a microscope illuminating apparatus according to the fourth embodiment of the present invention.
FIG. 7 is a plan view of an annular slit applied to the apparatus shown in FIG. 6.

In the fourth embodiment, an annular slit member 50 shown in FIG. 7 is fitted on a light-shielding tube 33a and is disposed in an illumination optical path 26.

In this embodiment, since the light in the sagittal direction which is guided to the illumination optical path 26 through the annular lens 28 is shielded by a plurality of slits radially formed in the annular slit member 50, flare caused by light in the sagittal direction can be prevented.

Figure 8:
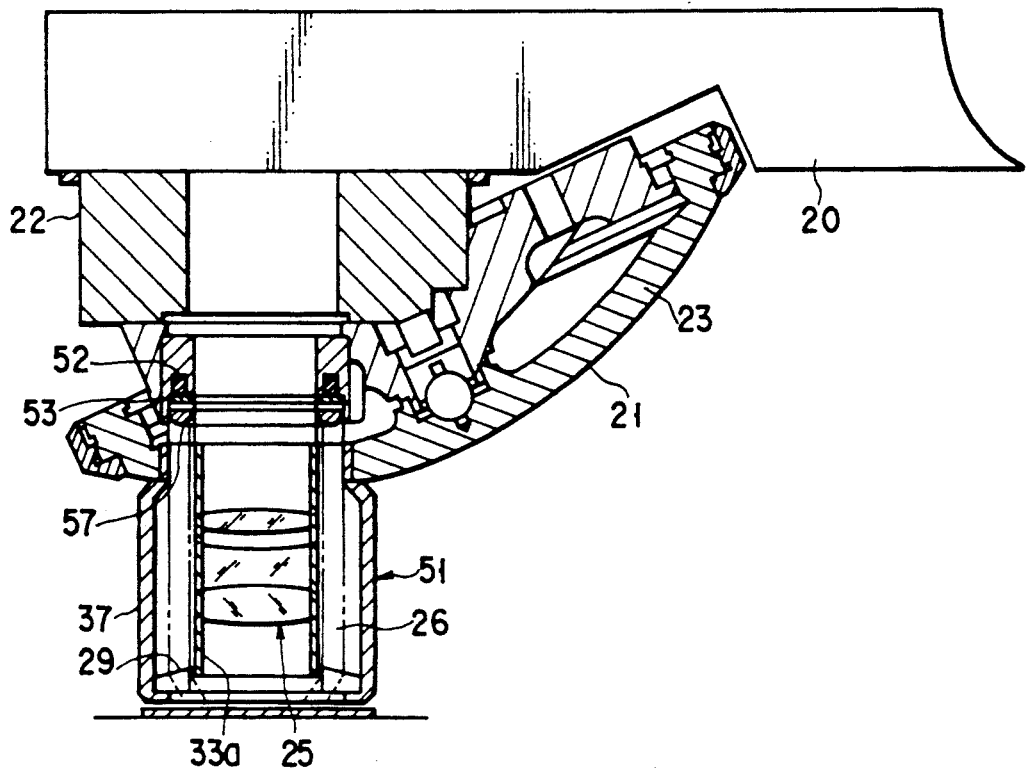
FIG. 8 is a sectional view schematically showing an arrangement of a microscope illuminating apparatus according to the fifth embodiment of the present invention.

A microscope illuminating apparatus according to the fifth embodiment of the present invention will be described with reference to FIG. 8. Note that the same portions as in the first embodiment are denoted by the same reference numerals, and a detailed description thereof is omitted.

In the fifth embodiment, an annular illuminating section 52, an annular lens 57, and a frost 53 are provided in a stationary side 22 of a revolver 21 which is to be mounted on a microscope body.

According to this embodiment, same as the embodiments described above, a decrease in quantity of light around the observation field can be prevented. Since the annular lens 57 and the frost 53 need not be arranged in an objective lens 24, a commercially available general objective lens 51 can be used.

Figure 26:
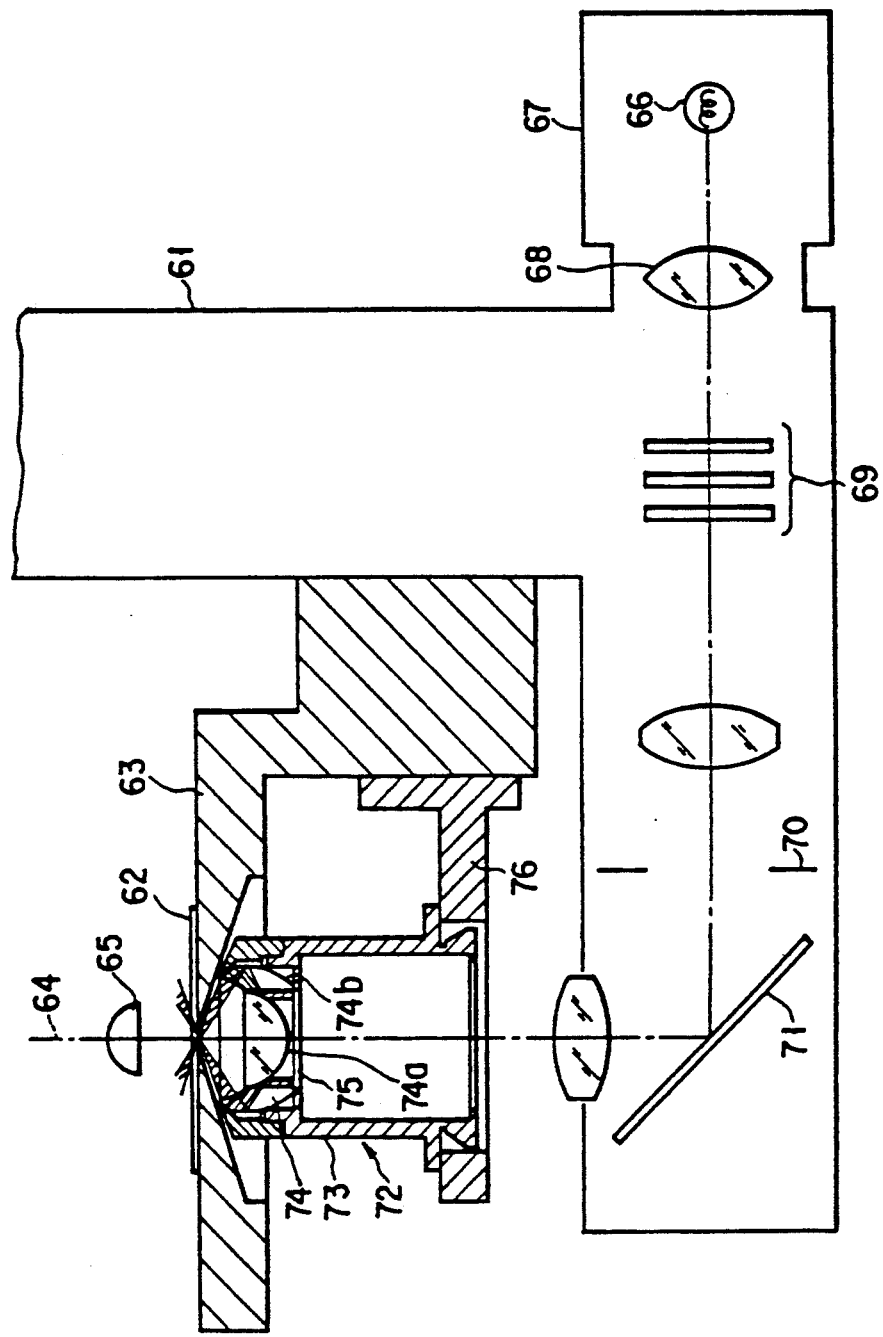
FIG. 26 shows an arrangement of a conventional microscope transmitted illuminating apparatus.
Figure 27:
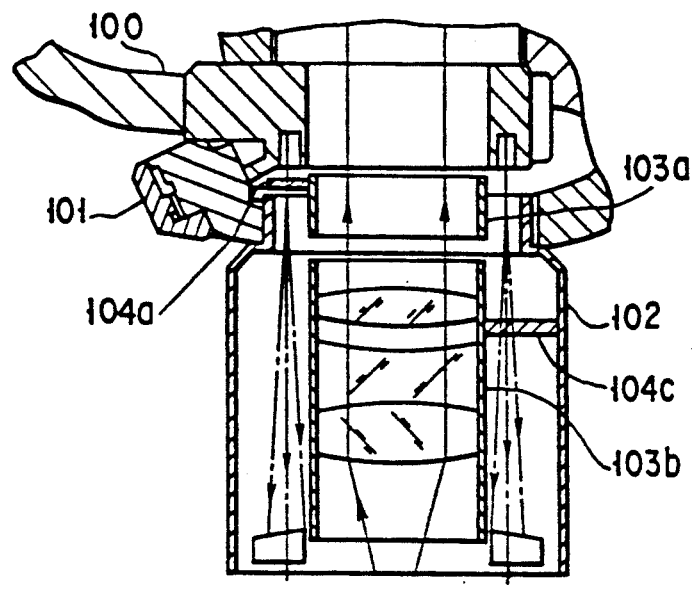
FIG. 27 is an enlarged sectional view of an objective lens portion of the conventional microscope reflected illuminating apparatus shown in FIG. 26.
Figure 28:
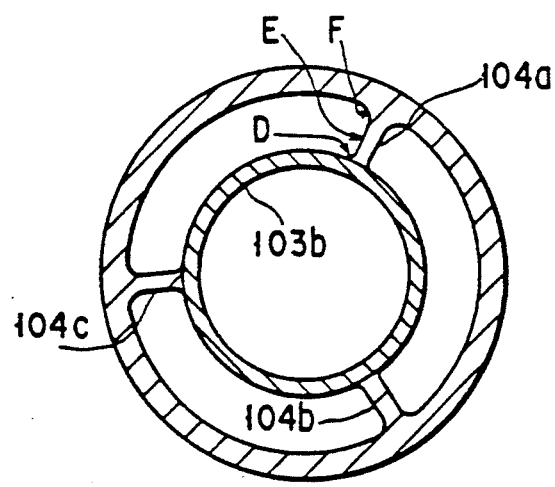
FIG. 28 is an enlarged sectional view of a light-shielding barrel provided to the objective lens shown in FIG. 27 and stays supporting the light-shielding barrel.

A microscope illuminating apparatus according to the sixth embodiment of the present invention will be described with reference to FIG. 9. Note that the same portions as in the conventional apparatus shown in FIG. 26 are denoted by the same reference numerals, and a detailed description thereof is omitted.

Figure 9:
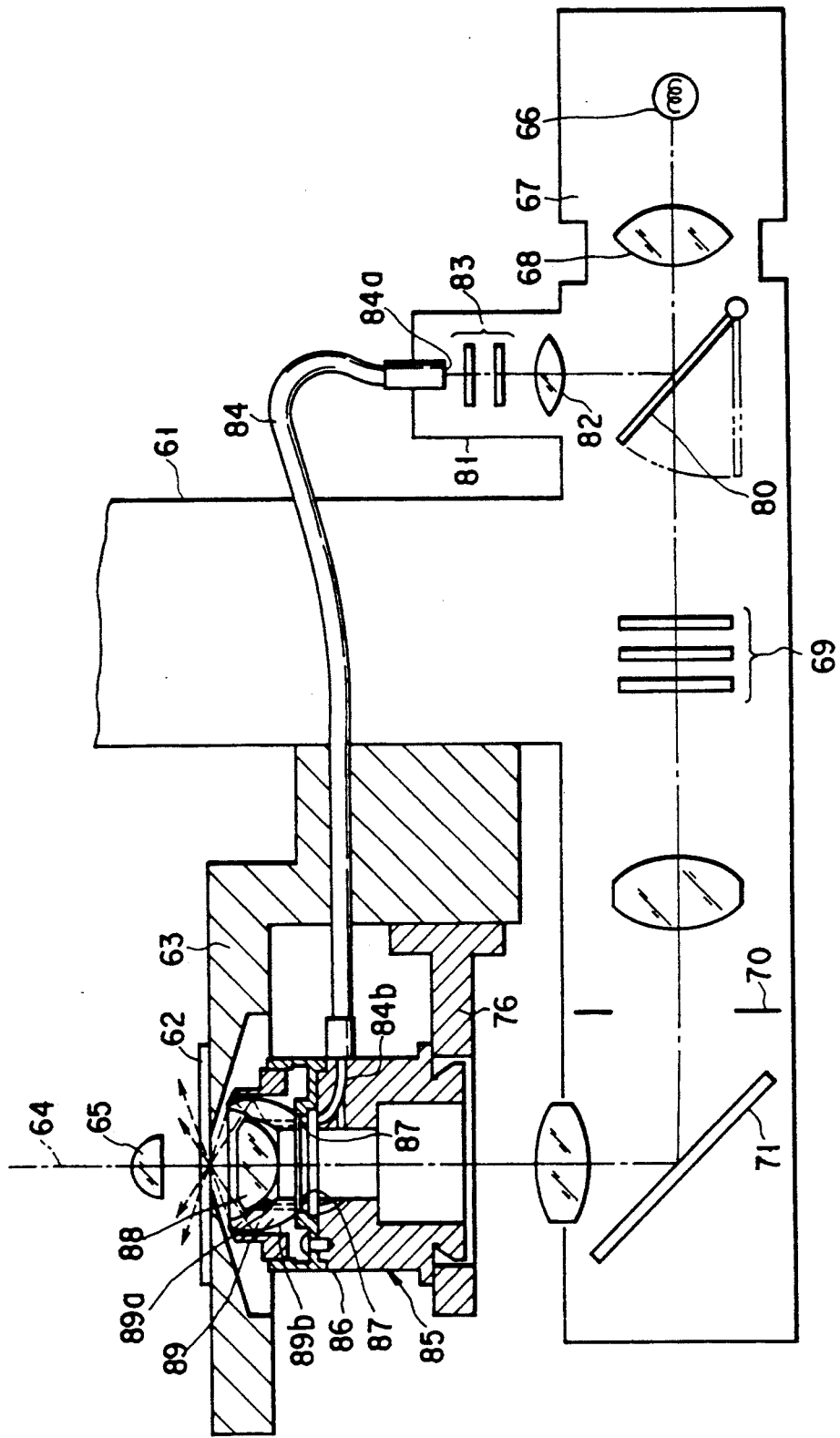
FIG. 9 is a sectional view schematically showing an arrangement of a microscope illuminating apparatus according to the sixth embodiment of the present invention.

As shown in FIG. 9, in the microscope illuminating apparatus according to the sixth embodiment, an illumination switching mirror 80 is disposed in the optical path between a condenser lens 68 and light control filters 69 in a lamphouse 67. The illumination switching mirror 80 can be operated from the outside the lamphouse 67 to switch the illumination beam emitted from a light source 66 toward the light control filters 69 or toward an optical path branching case 81.

An opening is formed in a wall surface of the light source close to the illumination switching mirror 80, and the bottomed cylindrical optical path branching case 81 is coupled to this opening.

The optical path branching case 81 has a condenser lens 82 and light control filters 83 which can be inserted in and removed from the illumination beams guided through the condenser lens 82 to adjust the brightness, color, or the like of illumination. An incident end 84a of an optical fiber bundle 84 is detachably connected to the bottom surface of the optical path branching case 81. An exit end 84b of the optical fiber bundle 84 is annularly disposed in an annular condenser case 86 of a bright/dark field condenser 85 to be described below.

An annular collimator lens (annular illuminating section) 87 for collimating the beam to an annular beam is disposed in the condenser case 86. A condenser lens 88 and an annular dark field condenser lens 89 having an arcuated wall surface to house the condenser lens 88 are housed in the condenser case 86.

The dark field condenser lens 89 is formed to transmit the beam passing through the condenser lens 88 therethrough along the optical axis. First and second reflecting surfaces 89a and 89b are formed on the inner and outer circumferential surfaces of the dark field condenser lens 89. The dark field condenser lens 89 and the condenser lens 88 are coaxially bonded to each other.

When dark field observation is to be performed by using this apparatus, the illumination switching mirror 80 is moved to a position indicated by a solid line in FIG. 9. As a result, the illumination beam emitted from the light source 66 is transmitted through the collector lens 68, reflected by the illumination switching mirror 80, and guided to the incident end 84a of the optical fiber bundle 84 through the condenser lens 82 and the light control filters 83.

The illumination beam emerging from the exit end 84b through the optical fiber bundle 84 is collimated to an annular parallel beam by the annular collimator lens (annular illuminating section) 87 and radiated on the dark field condenser lens 89.

The annular parallel beam incident on the dark field condenser lens 89 is guided from the first reflecting surface 89a to the second reflecting surface 89b and focused on a specimen 62. As a result, the illumination light is not directly incident on an objective lens 65, and efficient dark field illumination for the surface of the specimen 62 can be performed.

when bright field observation is to be performed, the illumination switching mirror 80 is moved to a position indicated by a broken line in FIG. 9. As a result, the illumination beam emitted from the light source 66 is incident on the bright/dark field condenser 85 through the filters 69 and a reflecting mirror 71. Since the condenser lens 89 is hollow along the optical axis, the illumination beam incident on the bright/dark field condenser 85 is focused on the specimen 62 through the condenser lens 88. As a result, bright field illumination is performed on the surface of the specimen 62.

As described above, not only very efficient dark field illumination can be performed in dark field observation, but also switching between dark field illumination and bright field illumination can be smoothly performed by only operating the illumination switching mirror 80. Furthermore, if the brightness, color, or the like of dark field illumination is adjusted by the light control filters 83 and if the illumination field is adjusted by a field stop 70 in advance, switching between dark field illumination and bright field illumination can be performed by only operating the illumination switching mirror 80.

In this embodiment, when a semi-transparent mirror is used as the illumination switching mirror 80, dark field illumination and bright field illumination can be simultaneously performed.

A microscope illuminating apparatus according to the seventh embodiment of the present invention will be described with reference to FIG. 10. Note that the same portions as in the sixth embodiment are denoted by the same reference numerals and a detailed description thereof is omitted.

Figure 10:
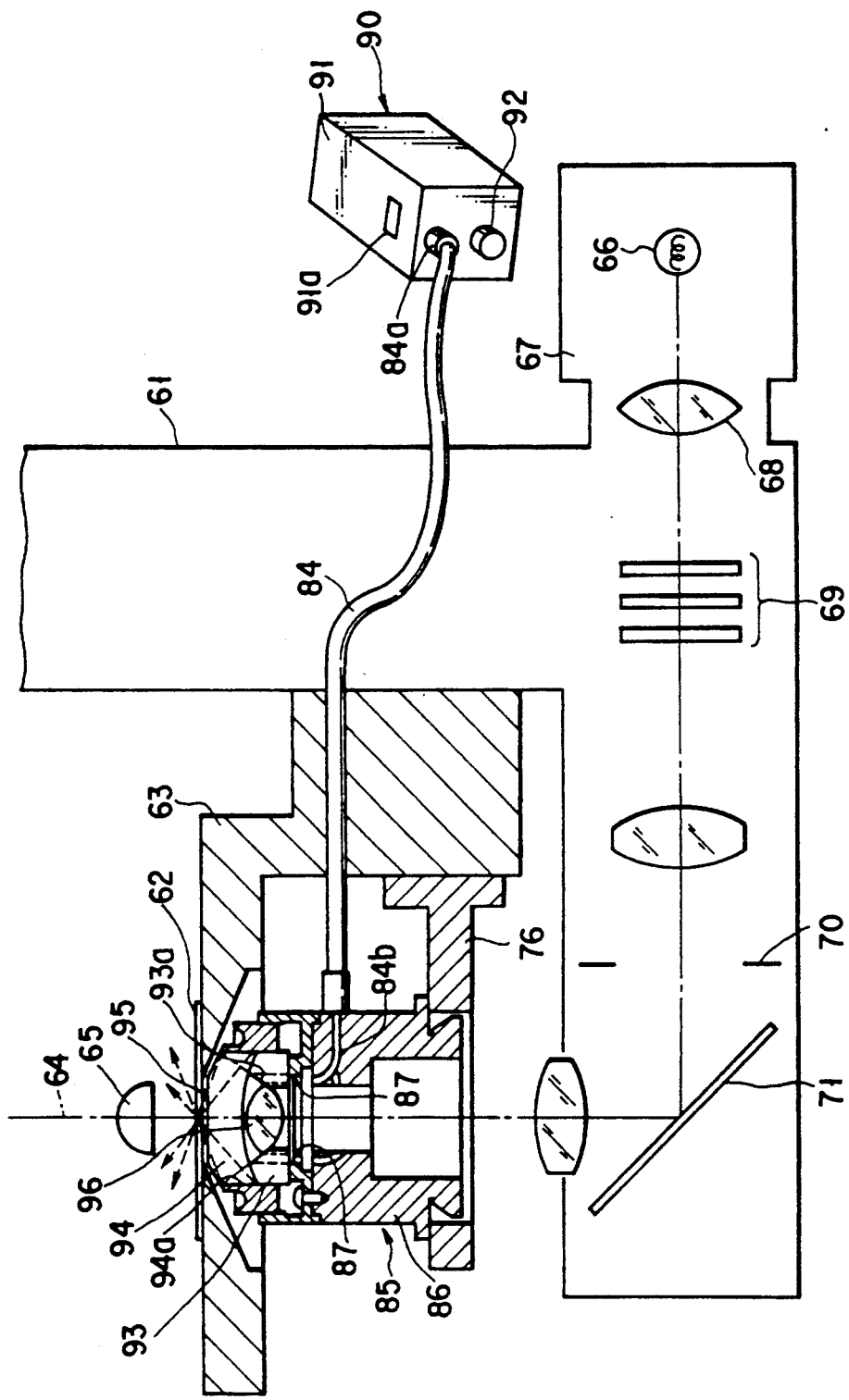
FIG. 10 is a sectional view schematically showing an arrangement of a microscope illuminating apparatus according to the seventh embodiment of the present invention.

As shown in FIG. 10, the microscope illuminating apparatus according to the seventh embodiment has a dark field light source unit 90 incorporating a light source (not shown) in addition to a light source 66 in order to guide the illumination beam emitted from the dark field light source unit 90 to an incident end 84a of an optical fiber bundle 84.

The dark field light source unit 90 has a light source box 91, a light control 92 for ON/OFF-controlling the light source (not shown) incorporated in the light source box 91 and the quantity of light to be generated, and a filter slot 91a through which a predetermined light control filter can be inserted and removed.

A bright/dark field condenser 85 has an arrangement as follows so that it can use an objective lens 65 having a large numerical aperture.

A condenser case 86 has an annular dark field condenser lens 93 and first and second condenser lenses 96 and 94. The annular dark field condenser lens 93 can receive an annular parallel beam emerging from an annular collimator lens (annular illuminating section) 87. The first condenser lens 96 is a convex lens concentrically bonded on the inner side of the dark field condenser lens 93. The second condenser lens 94 is arranged between the dark field condenser lens 93 and a specimen 62 such that its outer periphery contacts the dark field condenser lens 93.

The dark field condenser lens 93 has a reflecting surface 93a for reflecting the annular parallel beam guided through the annular collector lens (annular illuminating section) 87 toward the second condenser lens 94.

The second condenser lens 94 has a reflecting surface 94a for reflecting the beam guided through the dark field condenser lens 93 to be focused on the specimen 62.

A material, e.g., oil 95 which has a refractive index larger than that of air can be filled in the space between the second condenser lens 94 and the specimen 62 in order to increase the numerical aperture.

In the microscope illuminating apparatus having the above arrangement, when dark field observation is to be performed, the power supply (not shown) of the light source 66 in a lamphouse 67 is turned off, and the light control 92 of the dark field light source unit 90 is operated to turn on the power supply of the light source. Then, the illumination beam emitted from the light source (not shown) emerges from an exit end 84b of the optical fiber bundle 84, is collimated to an annular parallel beam by a collimator lens 87, and is incident on the dark field condenser lens 93.

The parallel beam incident on the dark field condenser lens 93 is reflected by the reflecting surface 93a of the lens 93 and guided to the second condenser lens 94. The beam guided to the second condenser lens 94 is reflected by the reflecting surface 94a of the lens 94 and focused on the specimen 62 through the oil 95. As a result, the illumination beam is not directly incident on an objective lens 65, and efficient dark field illumination for the surface of the specimen 62 can be performed.

In this case, since air is not present between the dark field condenser lens 94 and the specimen 62, dark field illumination with a numerical aperture of 1 or more can be performed. As a result, a lack in brightness in dark field illumination which often occurs when an objective lens 65 having a large numerical aperture is improved.

When bright field observation is to be performed, the light control 92 of the dark field light source unit 90 is operated to turn off the power supply of the light source, and the power supply (not shown) of the light source 66 in the lamphouse 68 is turned on. Then, the illumination light emitted from the light source 66 is focused on the specimen 62 through the first condenser lens 96 and the oil 95 to perform bright field illumination for the surface of the specimen 62. In this case, since the first condenser lens 96 and the dark field condenser lens 93 are bonded to each other, efficient illumination can be performed in bright field illumination as well.

In this manner, according to the microscope illuminating apparatus according to the seventh embodiment, switching between dark field illumination and bright field illumination can be easily performed, and a high illumination efficiency can be obtained in dark field illumination.

When a high-illumination light source unit is used as the dark field light source unit 90, dark field observation and bright field observation can be performed without changing a microscope frame 61.

A ratio in quantity of light of dark field illumination to bright field illumination can be easily changed by only operating the light control 92 of the dark field light source unit 90. In addition, desired illumination light can be easily obtained by inserting a predetermined light control filter in the filter slot 91a.

A microscope illuminating apparatus according to the eighth embodiment of the present invention will be described with reference to FIGS. 11A to 12.

Figure 12:
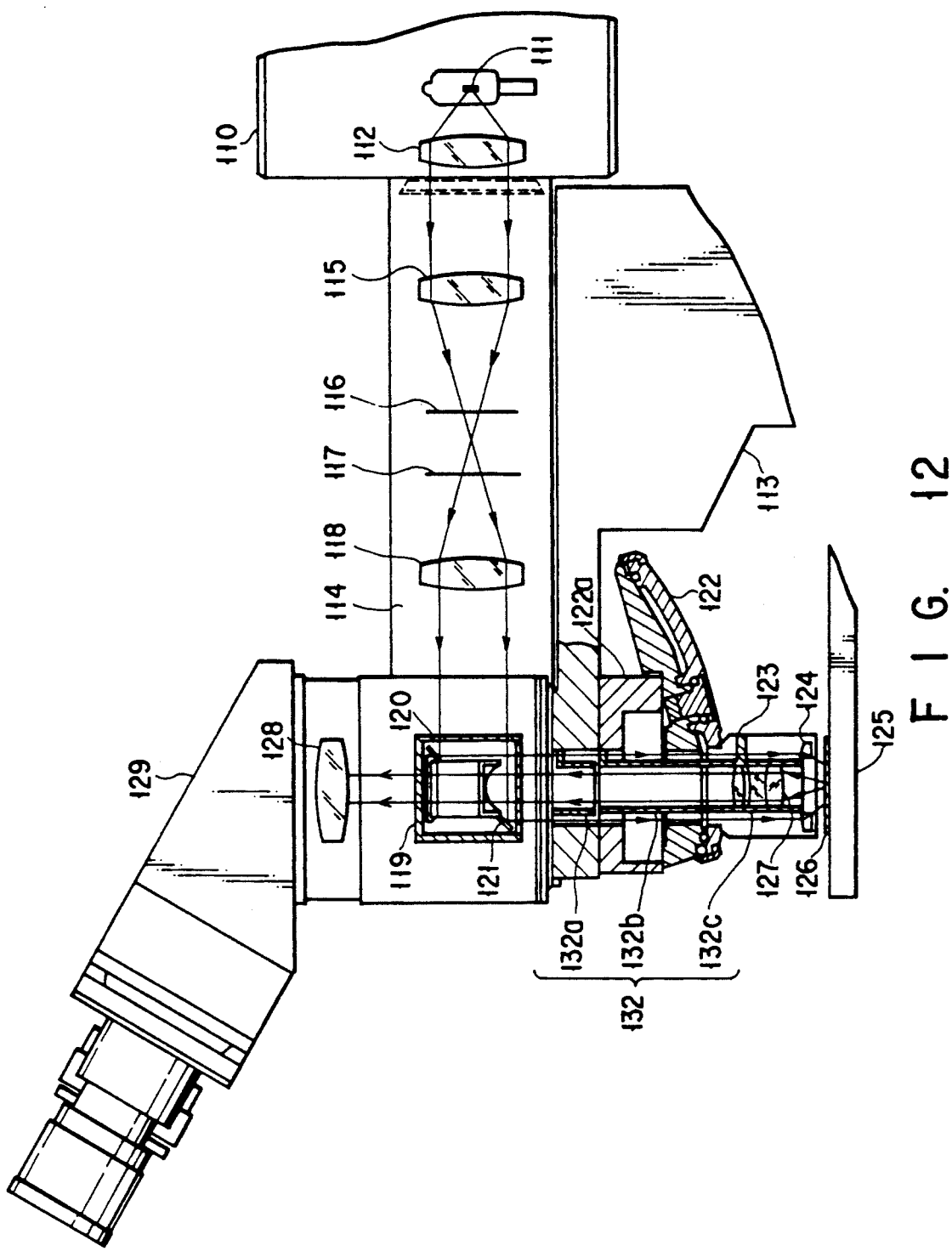
FIG. 12 is a partially sectional view schematically showing a major arrangement of a system microscope to which the microscope illuminating apparatus according to the eighth embodiment of the present invention is applied.

FIG. 12 shows a major arrangement of a system microscope to which the microscope illuminating apparatus according to the eighth embodiment is applied.

As shown in FIG. 12, illumination light emitted from a filament 111 incorporated in a lamphouse 110 is collimated to parallel rays by a collector lens 112 and guided to a reflected projection tube 114 supported by a lens body 113. The illumination light guided to the reflected projection tube 114 is condensed by a first illumination lens 115, collimated again to parallel rays through a field stop 117 and a second illumination lens 118, and irradiated on a dark field ring 120 supported by a cube 119. The illumination light irradiated on the dark field ring 120 is collimated to an annular parallel beam, and the annular parallel beam is irradiated on an annular holed mirror 121 supported by the cube 119. The illumination light radiated on the annular holed mirror 121 is reflected by it and incident on an objective lens 123 detachably mounted on a revolver 122. The illumination light incident on the objective lens 123 is focused on an object surface 126 on a stage 125 by an annular mirror or an annular lens 124 incorporated in the objective lens 123.

Scattered or diffracted light reflected by the object surface 126 is collimated to parallel rays by a lens 127 incorporated in the objective lens 123 to propagate through the observation optical path. The parallel rays are then radiated on an imaging lens 128 through the annular holed mirror 121. Reflected dark field observation of the object surface 126 is performed by observing the image formed by the imaging lens 128 through a lens tube 129.

The cube 119 can incorporate a mirror and a filter and is detachably mounted on the incidence projection tube 114. A plurality of cubes 119 each having this arrangement are selectively used in the reflected projection tube 114 in accordance with the type of observation.

Figure 11A:
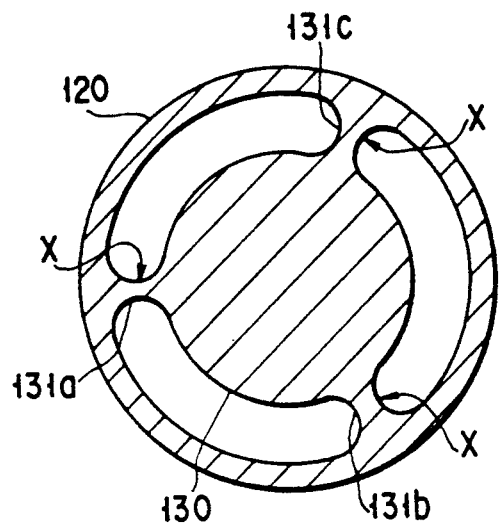
FIG. 11A is an enlarged sectional view of a dark field ring applied to the microscope illuminating apparatus according to the eighth embodiment of the present invention.

FIG. 11A is a sectional view of the dark field ring 120 employed in the microscope illuminating apparatus according to the eighth embodiment of the present invention. The dark field ring 120 has a stop 130 for removing the central portion of the illumination light radiated on it, and three support members, e.g., stays 131a, 131b, and 131c disposed at an angular interval of substantially 120° for fixing the stop 130 on the incidence projection tube 114 or the cube 119. Each of the stays 131a, 131b, and 131c has an arcuate shape.

It is preferable that the radius of curvature (R) of a portion X of each of the arcuate-shaped stays 131a, 131b, and 131c is set to ½R or more the width of the illumination optical path defined between the dark field ring 120 and a light-shielding tube 132.

Figure 11B:
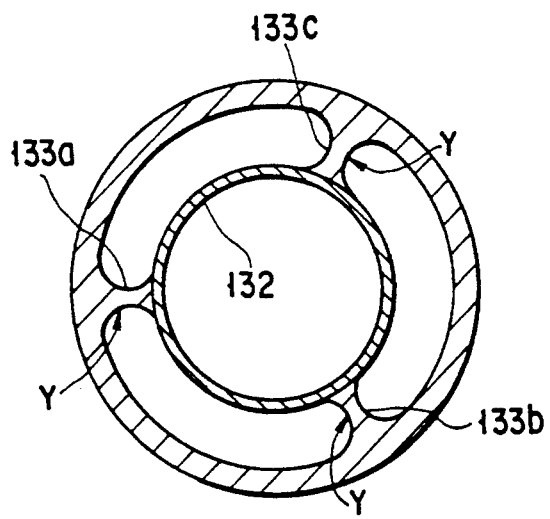
FIG. 11B is an enlarged sectional view of a light-shielding tube applied to the microscope illuminating apparatus according to the eighth embodiment of the present invention.

FIG. 11B is a sectional view of the light-shielding tube 132 provided in the microscope illuminating apparatus described above in order to prevent mixing of the annular illumination light in the observation optical path.

As shown in FIG. 12, the light-shielding tube 132 comprises light-shielding tubes 132a, 132b, and 132c. Of the light-shielding tubes 132a, 132b, and 132c, the light-shielding tube 132a is arranged in the lens body 113, the light-shielding tube 132b is arranged in a member 122a for integrally supporting the revolver 122, and the light-shielding tube 132c is arranged in the objective lens 123.

FIG. 11B is a sectional view of three support members, i.e., stays 133a, 133b, and 133c disposed at an angular interval of substantially 120° for fixing the light-shielding tube 132 on the member 122a, which integrally supports the lens body 113 and the revolver 122, and on the objective lens 123. Each of the stays 133a, 133b, and 133c has an arcuate shape as the stays 131a, 131b, and 131c described above do.

It is preferable that the radius of curvature (R) of a portion Y of each of the arcuate-shaped stays 133a, 133b, and 133c is set to ½R or more the width of the illumination optical path defined around the light-shielding tube 132.

In this manner, in the microscope illuminating apparatus according to the eighth embodiment of the present invention, the stays 131a, 131b, and 131c of the dark field ring 120 and the stays 133a, 133b, and 133c of the light-shielding tube 132 have the same arcuated shape. Hence, the diffraction effect caused by the stays is weakened, and illumination light having a small difference between the brightness and darkness is supplied to the objective lens 123 as the reflected dark field illumination. As a result, a small object can be precisely observed from its observation image or picture in accordance with high-precision reflected dark field observation.

A microscope illuminating apparatus according to the ninth embodiment of the present invention will be described with reference to FIGS. 13 and 14. Note that the same portions as in the eighth embodiment are denoted by the same reference numerals, and a detailed description thereof is omitted.

Figure 13:
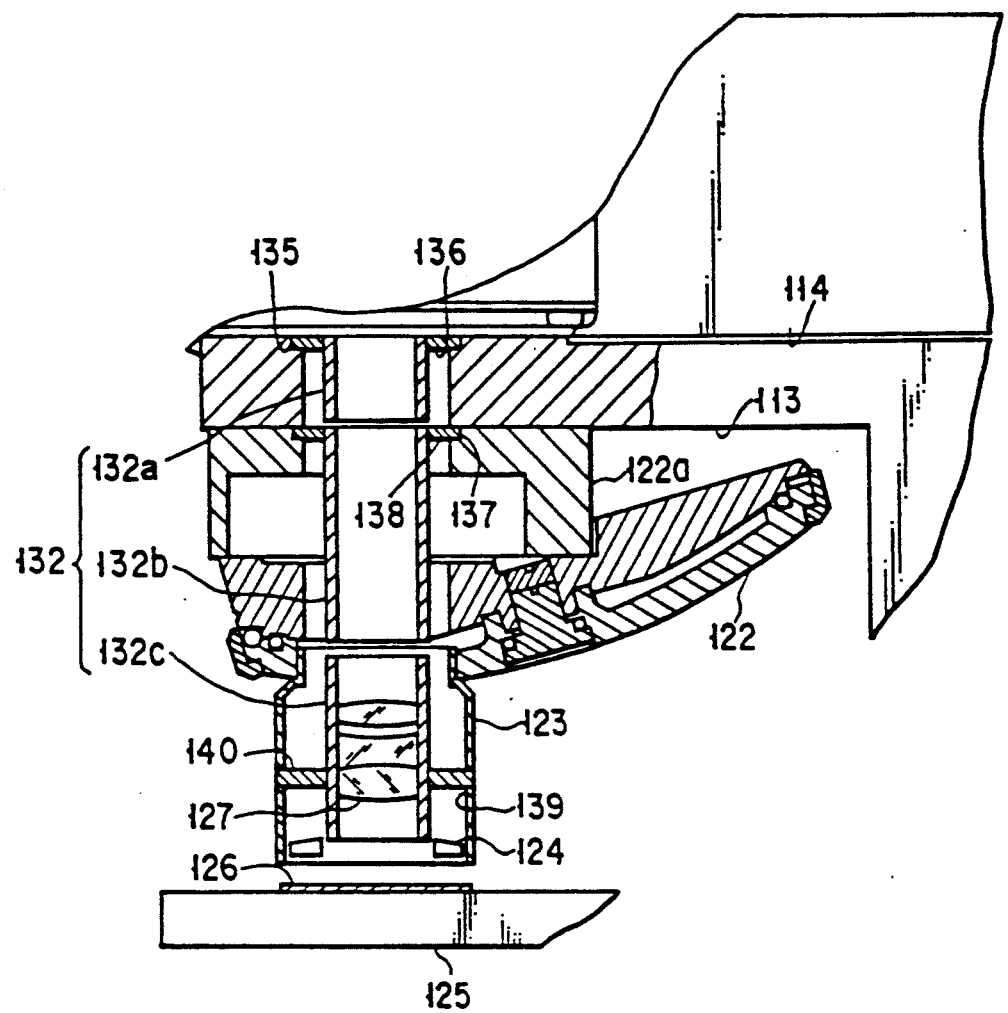
FIG. 13 is an partially sectional enlarged view schematically showing a major arrangement of a system microscope to which a microscope illuminating apparatus according to the ninth embodiment of the present invention is applied.

FIG. 13 shows a major arrangement of a system microscope to which the microscope illuminating apparatus according to the ninth embodiment is provided.

As shown in FIG. 13, a first engaging groove 135 having a diameter larger than the spot diameter of the dark field illumination beam is formed in a lens body 113. A first annular transparent member (e.g., a glass or plastic member) 136 having the same outer diameter as that of the first engaging groove 135 is fitted in the first engaging groove 135. A second engaging groove 137 is formed in a member 122a for integrally supporting a revolver 122. A second annular transparent member 138 is fitted in the second engaging groove 137.

A third engaging groove 139 having a diameter larger than the spot diameter of the dark field illumination beam is formed in an objective lens 123. A third annular transparent member 140 having the same outer diameter as that of the third engaging groove 139 is fitted in the third engaging groove 139.

Figure 14:
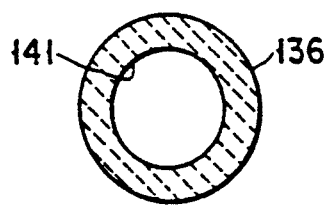
FIG. 14 is an enlarged plan view of an annular transparent member provided to the microscope illuminating apparatus shown in FIG. 13.

FIG. 14 is a plan view of the first annular transparent member 136. A description of the second and third annular transparent members 138 and 140 is omitted as they are identical to the first annular transparent member 136.

As shown in FIG. 14, a circular hole 141 through which observation light reflected by an object surface 126 can be transmitted is formed at the central portion of the first annular transparent member 136. The annular illumination light emitted from the filament 111 (FIG. 12) is transmitted through the annular portion of the first annular transparent member 136.

The diameter of the circular hole 141 is the same as the outer diameter of the light-shielding tube 132a described above. Hence, the light-shielding tube 132a is fitted in the circular hole 141 to be fixed in the lens body 113. Similarly, the light-shielding tubes 132b and 132c are fitted in the second and third annular transparent members 138 and 140, respectively, to be fixed on the members 122a, which integrally support the revolver 122, and the objective lens 123, respectively.

Since the microscope illuminating apparatus according to the ninth embodiment does not require stays 131a to 131c and 133a to 133c as those described above, it is completely free from the shadows or the diffraction effect caused by these stays, and ideal incidence dark field illumination light having no difference between its brightness and darkness is supplied to the objective lens 123. As a result, a small object can be precisely observed from its observation image or picture in accordance with high-precision reflected dark field observation.

The first to third annular transparent members 136, 138, and 140 are not limited to be annular and can be of any shape as far as they are transparent members. Completely the same effect as described above can be obtained even if the dark field ring is set be annular.

A microscope illuminating apparatus according to the tenth embodiment of the present invention will be described with reference to FIGS. 15A, 15B to 16. The same portions as in the eighth embodiment are denoted by the same reference numerals, and a detailed description thereof is omitted.

Figure 15A:
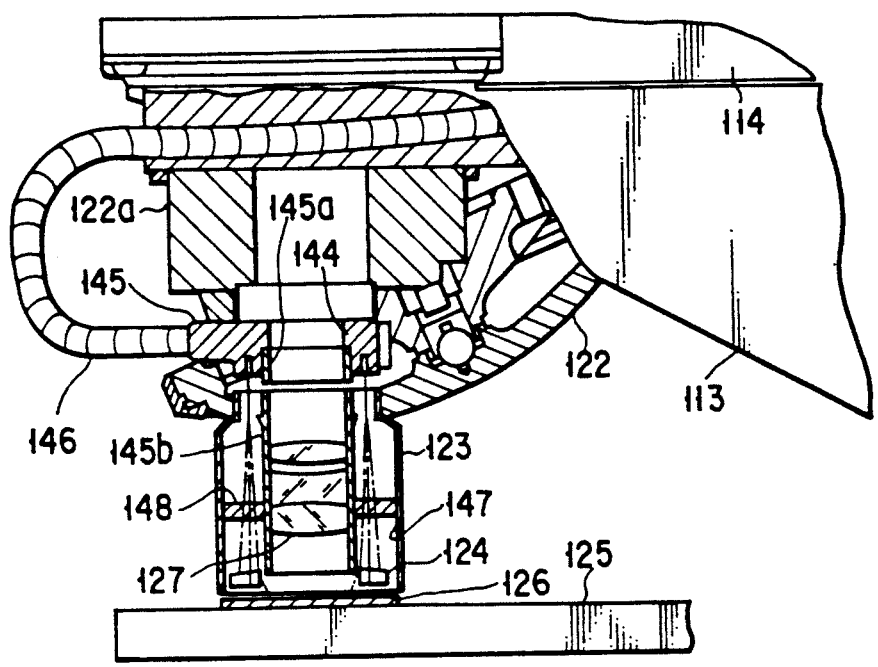
FIG. 15A is a partially sectional enlarged view schematically showing a major arrangement of a system microscope to which a microscope illuminating apparatus according to the tenth embodiment of the present invention is applied.
Figure 15B:
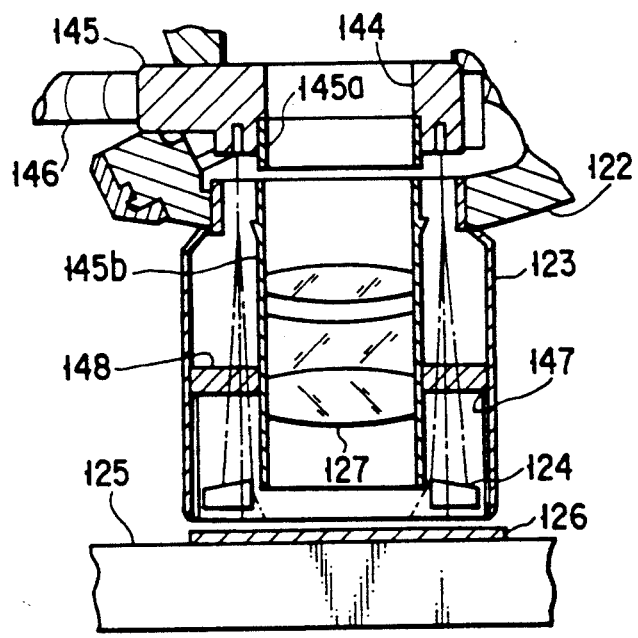
FIG. 15B is a partially sectional enlarged view showing an objective lens portion shown in FIG. 15A.

FIGS. 15A and 15B show the major arrangement of a system microscope to which the microscope illuminating apparatus according to the tenth embodiment of the present invention is provided.

As shown in FIGS. 15A and 15B, a stationary member 145 having an observation hole 144 through which observation light reflected by an object surface 126 can be transmitted is detachably mounted on a revolver 122. The stationary member 145 is optically connected to an optical fiber 146 having an annular exit end which guides incidence dark field illumination light. Part of the observation hole 144 of the stationary member 145 has the same diameter as the outer diameter of a light-shielding tube 145a which prevents mixing of the annular illumination light in the observation optical path. An edge of the light-shielding tube 145a on its one end is engaged and fixed in the observation hole 144.

An engaging groove 147 having a diameter larger than the spot diameter of the dark field illumination light is formed in the objective lens 123. An annular transparent member 148 having the same outer diameter as the engaging groove 147 is engaged in the engaging groove 147. A circular hole (not shown) through which an observation hole reflected by the object surface 126 can be transmitted is formed at the central portion of the annular transparent member 148. The diameter of this circular hole is the same as the outer diameter of a light-shielding tube 145b, and the light-shielding tube 145b is fitted and fixed in this circular hole.

Figure 16:
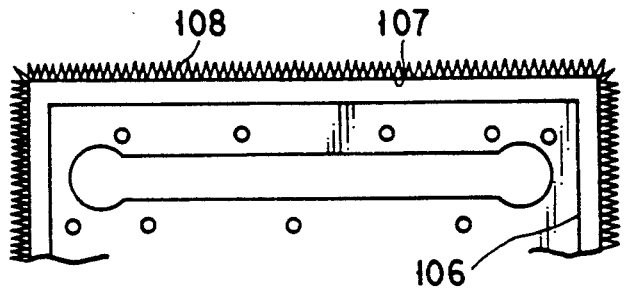
FIG. 16 is an enlarged plan view of an observation image observed when incidence dark field observation is performed by using the system microscope shown in FIG. 15A.

FIG. 16 shows an observation image obtained when incidence dark field observation is performed by using the microscope illuminating apparatus of this embodiment.

Figure 17:
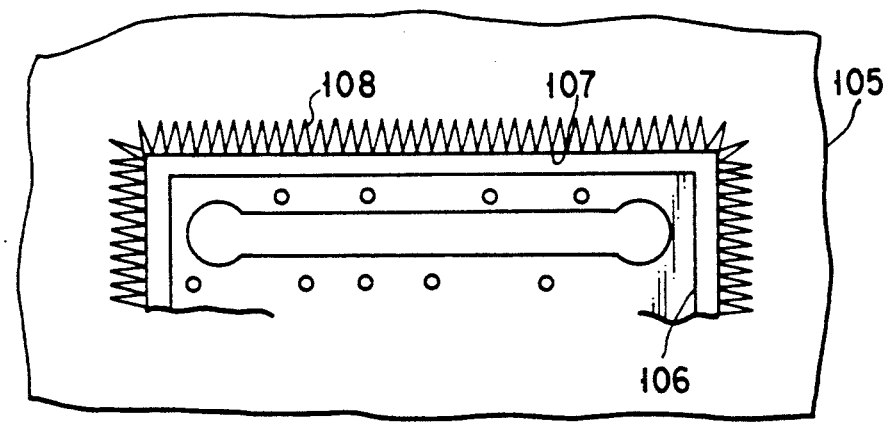
FIG. 17 is an enlarged plan view of an observation image observed when incidence dark field observation is performed by using a system microscope to which a conventional microscope illuminating apparatus is provided.

As is apparent from FIG. 16, a shag 108 formed at an edge 107 portion of a pattern 106 is decreased when compared to the conventional observation image (see FIG. 17).

In this manner, since the microscope illuminating apparatus of the tenth embodiment of the present invention does not need stays for fixing the light-shielding tubes 145a and 145b on the revolver 122 and an objective lens 123, it is completely free from an influence of the shadows or the diffraction effect caused by the stays, and ideal incidence dark field illumination light having no difference between its brightness and darkness is supplied to the objective lens 123. Since only one transparent member 148 suffices, the number of components of the apparatus is decreased, and the manufacturing cost is thus decreased. As a result, a small object can be precisely observed from its observation image or picture in accordance with high-precision reflected dark field observation. The annular transparent member 148 of this embodiment is limited to be annular and can be of any shape as far as it is a transparent member.

This embodiment is not limited to the arrangement described above. For example, the optical fiber 146 can be detachably mounted on a member 122a for integrally fixing the revolver 122.

A microscope illuminating apparatus according to the eleventh embodiment of the present invention will be described with reference to FIGS. 18A to 20.

Figure 18A:
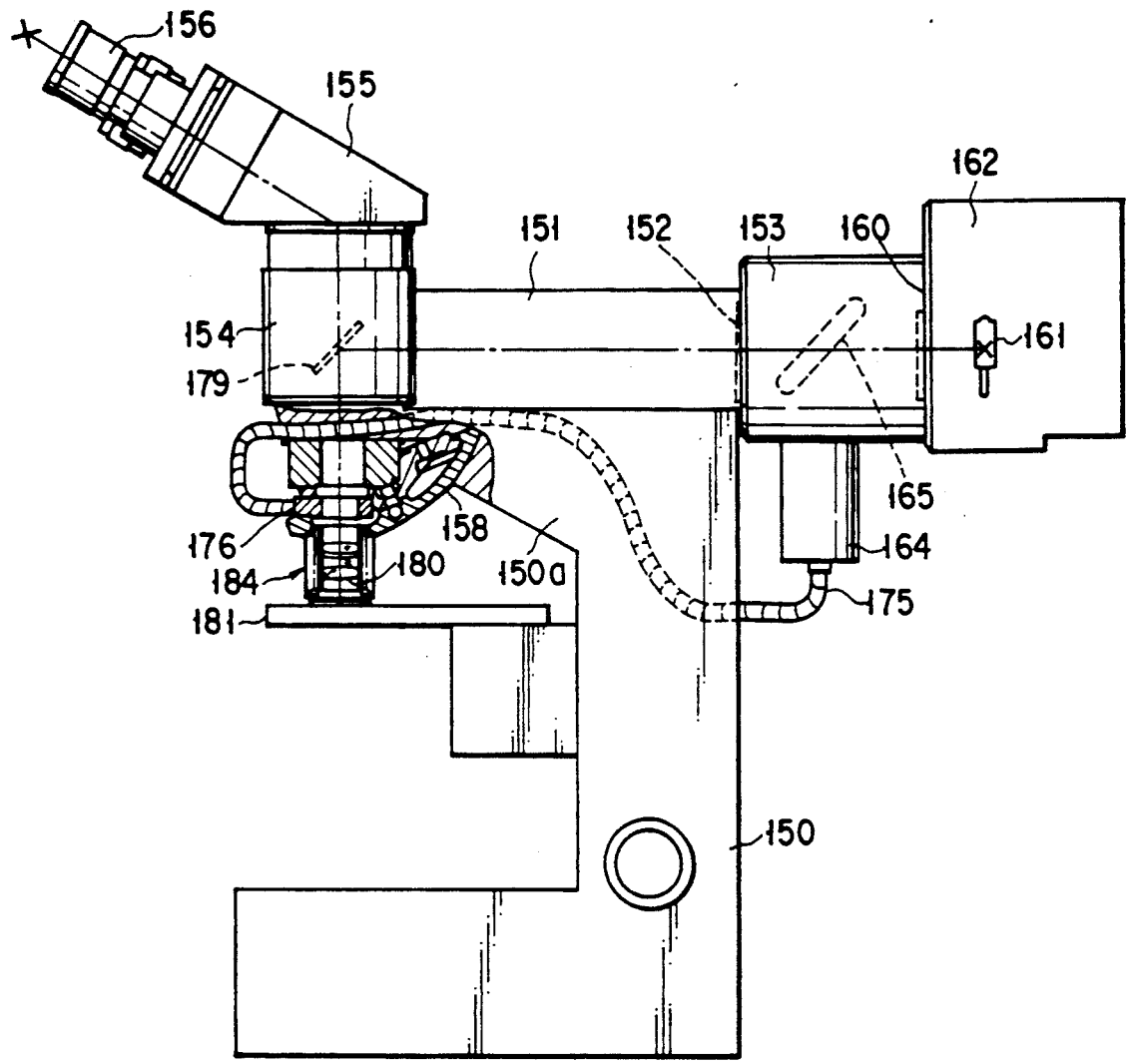
FIG. 18A schematically shows an arrangement of system microscope to which a microscope illuminating apparatus according to the eleventh embodiment of the present invention is applied.
Figure 18B:
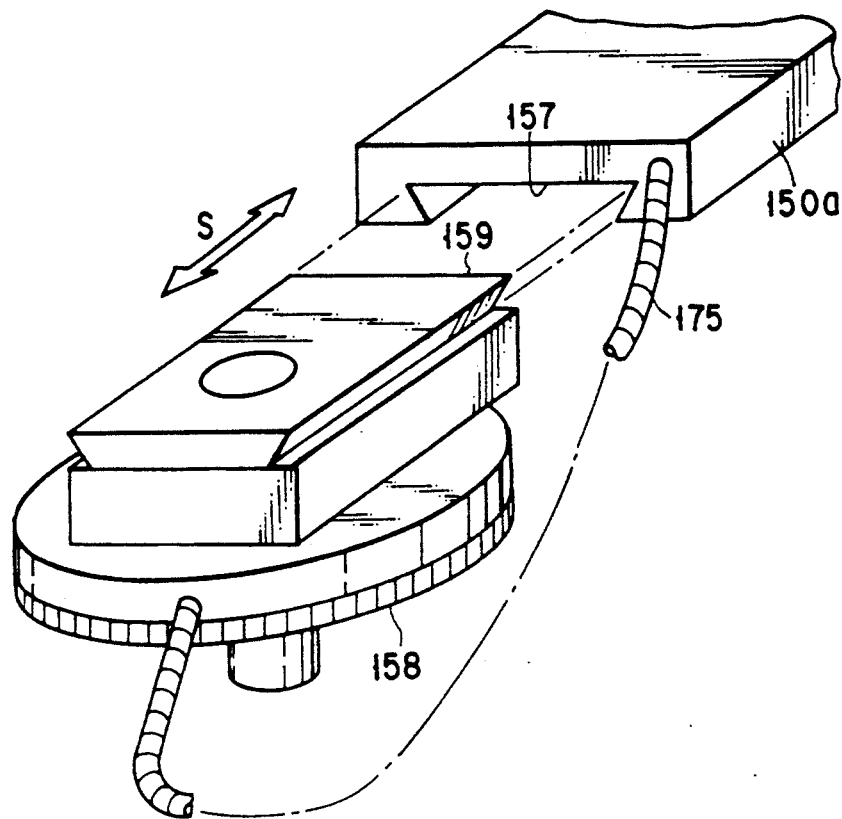
FIG. 18B shows a state in which a revolver is being mounted on an arm portion of a microscope body.
Figure 18C:
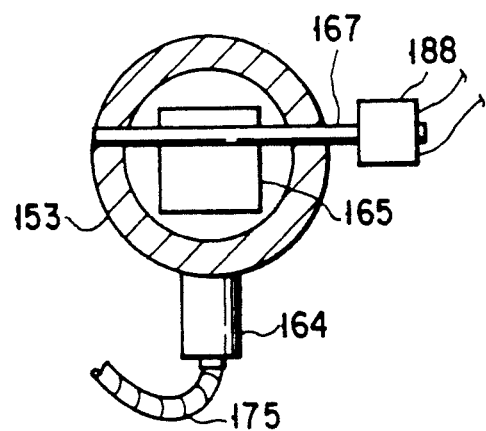
FIG. 18C shows a state in which an electrical means for electrically driving a total reflection mirror is provided to a dark field illumination unit.

As shown in FIGS. 18A, 18B, and 18C, a system microscope to which the microscope illuminating apparatus according to the eleventh embodiment of the present invention has a microscope body 150 and a bright field system projection tube 151 provided on the microscope body 150.

For example, a round dovetail engaging portion 152 is formed at one end of the bright field system projection tube 151, and a dark field illumination unit 153 is detachably mounted on the engaging portion 152.

A lens barrel sleeve 154 is connected to the other end of the bright field system projection tube 151. A lens barrel 155 projects from the upper portion of the lens barrel sleeve 154, and an eyepiece 156 is mounted on the distal end of the lens barrel 155.

As shown in FIG. 18B, a linear slide groove 157 is formed on an arm portion 150a of the microscope body 150. As a result, various types of revolvers 158 can be mounted on and detached from the arm portion 150a by inserting and removing (insertion and removal directions are indicated by a double-headed arrow S) their dovetail portions 159 along the linear slide groove 157. In the eleventh embodiment, a bright/dark field revolver 158 to be described later is detachably mounted on the arm portion 150a.

A lamphouse 162 incorporating a lamp 161 is detachably mounted on the dark field illumination unit 153 through, e.g., a round dovetail engaging portion 160 having the same figure as the round dovetail engaging portion 152.

The dark field observation unit 153 will be described with reference to FIGS. 19A, 19B, and 19C.

The dark field illumination unit 153 has a switching unit 163, mounted between the bright field system projection tube 151 and the lamphouse 162 through engaging portions 152 and 160 described above, and an attachment 164 mounted on the switching unit 163.

Figure 19A:
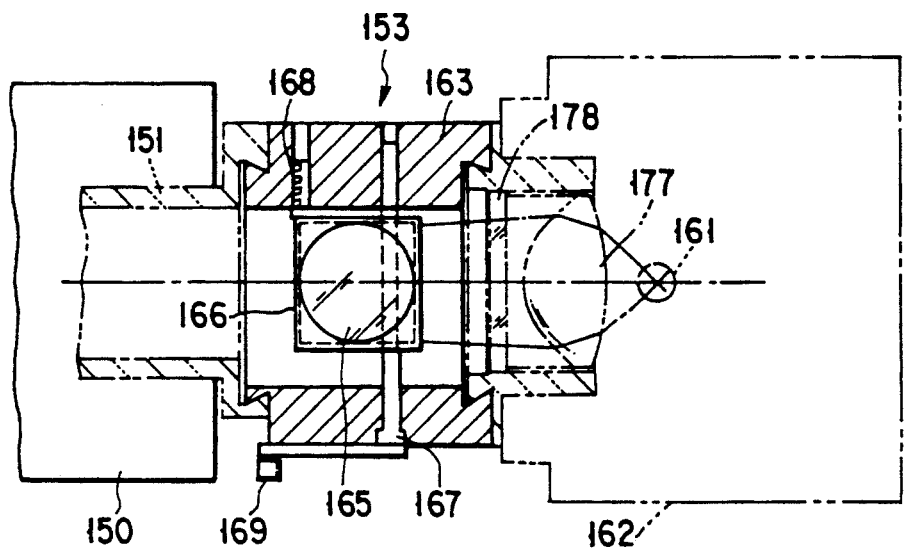
FIG. 19A is a sectional view schematically showing an arrangement of the dark field illumination unit mounted on the system microscope shown in FIG. 18A.
Figure 19B:
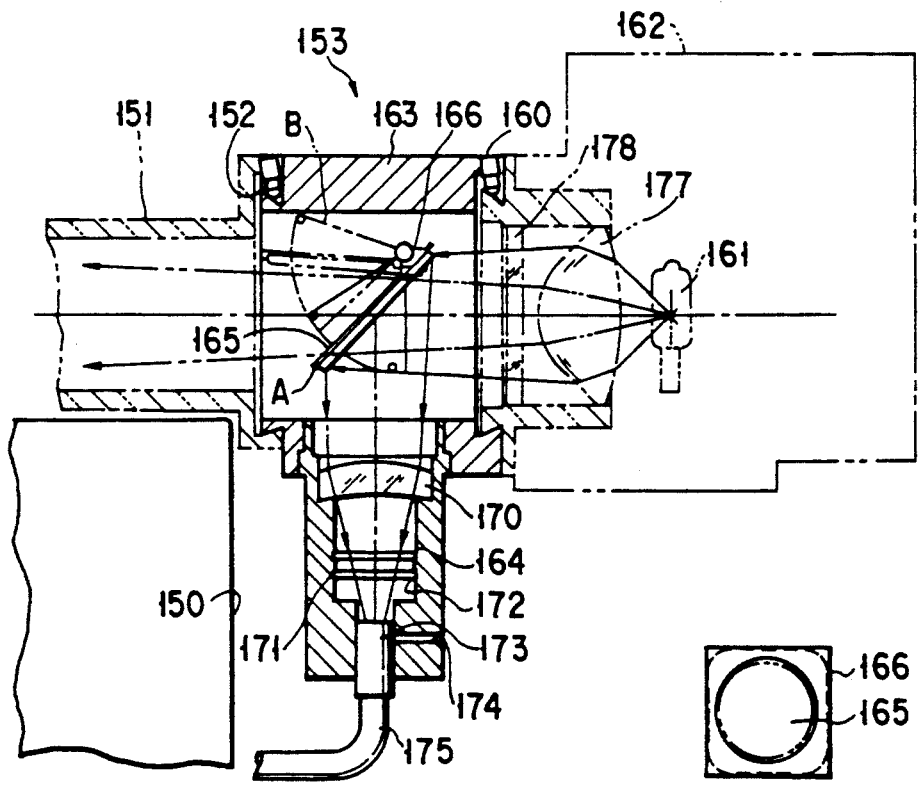
FIG. 19B is a side view of the portion shown in FIG. 19A.
Figure 19C:
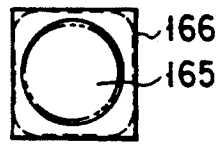
FIG. 19C is a plan view of a mirror seat incorporated in the dark field illumination unit and the total reflection mirror provided on the mirror seat.

A hollow space for transmitting the illumination light from the lamphouse 162 therethrough is formed in the switching unit 163, and a total reflection mirror 165 as shown in FIG. 19C is provided in this hollow space. The total reflection mirror 165 is fixed to a mirror seat 166. One end portion of the mirror seat 166 is supported on a pivotal shaft 167 so that the mirror seat 166 is swingable about the pivotal shaft 167. The pivotal shaft 167 extends in the hollow space in a direction perpendicular to the optical axis of the illumination light. The two ends of the pivotal shaft 167 are pivotally supported by the switching unit 163.

The mirror seat 166 is swingable between a position A (a 45° position with respect to the optical axis) and a position B (off the optical path) in FIG. 19B and is held at the position A or B through a click 168 (see FIG. 19A). A control 169 for pivoting the pivotal shaft 167 is provided on the outer portion of the switching unit 163.

A hole having a predetermined size is formed at the central portion of the mirror seat 166. Thus, when a half mirror or the like is supported by the mirror seat 166, part of the illumination light incident on the half mirror or the like can be transmitted toward the bright field system projection tube 151.

The attachment 164 incorporates a condenser lens 170 for receiving the illumination light reflected by the total reflection mirror 165. A dark field system illumination filter 171 (e.g., a color temperature change filter or an ND filter) is provided below the condenser lens 170. The filter 171 is detachably supported through a notched portion 172 formed on the inner circumferential surface of the attachment 164. A joint portion 173 of an optical fiber is fixed at a lowermost portion of the attachment 164 by a screw 174. An optical fiber tube 175 extending from the joint portion 173 extends through the arm portion 150a of the microscope body 150 and is connected to an annular light source section (i.e., an annular illuminating section) 176 (see FIGS. 18A, 18B, and 20) detachably provided in the bright-/dark field revolver 158.

The dark field illumination unit 153 can be rotated through 360° about the optical axis by the engaging portions 152 and 160 described above. Hence, when the dark field illumination unit 153 is mounted on various types of lens bases, the dark field illumination unit 153 can be rotated so as not to be interfered with by the exit end of the optical fiber and the operating section 153 of the dark field illumination unit 153 can be set at an easily accessible position.

The operation of the microscope illuminating apparatus according to the eleventh embodiment will be described.

A bright field system revolver is removed, and the bright/dark field revolver 158 is mounted on the arm portion 150a of the microscope body 150. The lamphouse 162 is temporarily removed from the bright field system projection tube 151, and the dark field illumination unit 153 is mounted on the bright field system projection tube 151. Then, the lamphouse 162 is mounted on the dark field illumination unit 153. Thereafter, the optical fiber tube 175 is inserted in the arm portion 150a, and the joint portion 173 of the optical fiber tube 175 is connected to the attachment 164.

Assume that when assembly of this apparatus is completed, bright illumination field system observation is to be performed first. This case will be described with reference to FIGS. 18A to 20.

The control 169 (see FIG. 19A) is pivoted to fix the mirror seat 166 at the position B (see FIG. 19B) by the click 168.

When the mirror seat 166 is at the position B, the total reflection mirror 165 supported by the mirror seat 166 is off the optical path of the illumination light. Thus, the parallel illumination rays having a predetermined wavelength which are supplied from the lamp 161 through a collector lens 177 and a filter 178 are guided to the lens barrel sleeve 154 (see FIG. 18A) through the dark field system unit 153 and the bright field system projection tube 151.

As shown in FIG. 18A, the guided illumination light is radiated on a half mirror 179 which is disposed in the lens barrel sleeve 154 at an angle of 45° with respect to the optical axis. The illumination light reflected by the half mirror 179 is focused on a specimen 182 (see FIG. 20) disposed on a stage 181 through the bright/dark field revolver 158 and a bright/dark objective lens 180.

The light reflected by the specimen 182 is radiated on an imaging lens (not shown) through the bright/dark objective lens 180, the bright/dark revolver 158, and the half mirror 179. Bright field system observation for the surface of the specimen 182 is performed through the eyepiece 156 by observing the image formed by the imaging lens.

A case in which dark field system observation is to be performed will be described with reference to FIGS. 18A to 20.

The control 169 is pivoted to fix the mirror seat 166 at the position A (see FIG. 19B) by the click 168. When the mirror seat 166 is at the position A, the total reflection mirror 165 supported by the mirror seat 166 is disposed at an angle of 45° with respect to the optical axis of the illumination light. Hence, the parallel dark field illumination rays supplied from the lamp 161 through the collector lens 177 and the filter 178 are reflected by the total reflection mirror 165 toward the attachment 164 and radiated on the condenser lens 170.

The illumination light radiated on the condenser lens 170 is condensed on the joint portion 173 of the optical fiber tube 175 through the filter 171.

The illumination light condensed on the joint portion 173 is guided, through the optical fiber tube 175, to the annular light source section (i.e., the annular illuminating section) 176 detachably provided in the bright/dark field revolver 158. The guided dark field illumination light is collimated to parallel rays by an annular lens 183 (see FIG. 20) opposing the annular light source section (i.e., the annular illuminating section) 176.

The parallel dark field illumination rays are radiated on an annular condenser lens 187 through a dark field illumination optical path 186 defined between an outer frame 184a of an objective lens 184 and a light-shielding tube 185 for separating the illumination light from the observation light. The dark field illumination light is radiated on the specimen 182 on the stage 181 by the annular condenser lens 187.

The diffracted light reflected by the specimen 182 is radiated on an imaging lens (not shown) by the bright/dark field objective lens 180 supported by the light-shielding tube 185 in the objective lens 184 through the bright/dark field revolver 158 and the half mirror 179. The dark field system observation for the surface of the specimen 182 is performed through the eyepiece 156 by observing the image formed by the imaging lens.

Since the illumination light supplied from the collector lens 177 incorporated in the lamphouse 162 is collimated, it will not adversely affect the optical system on the bright field system projection tube 151 side even if the dark field illumination unit 153 is mounted while the distance between, e.g., the collector lens 177 and the illumination lens (not shown) incorporated in the bright field system projection tube 151 is set long.

In this manner, according to the microscope illuminating apparatus according to the eleventh embodiment of the present invention, reflected dark field observation can be performed by using the bright field system projection tube 151 without a change. Thus, the performance of the microscope as a system can be improved. As a result, since an expensive bright/dark field projection tube need not be separately purchased, unlike in the conventional apparatus, an extra expenditure can be eliminated.

Since the dark field illumination unit 153 is used, the light source of the lamphouse 161 together with the incidence projection tube can be used without a change. Hence, an expensive external light source need not be separately purchased.

The present invention is not limited to the arrangement of the eleventh embodiment described above. For example, other polarizing elements (i.e., a half mirror or a beam splitter having a different transmittance) can be used in place of the total reflection mirror 165. When such a polarizing element is used, reflected dark field observation and other optical observations (e.g., reflected bright field observation) can be simultaneously performed. Accordingly, reflected fluorescence observation and reflected dark field observation can be simultaneously performed in the field of biology, the time required for observation of a specimen dyed with multiple of colors can be shortened, and the observation precision can be improved.

As shown in FIG. 18C, as a method of performing switching among dark field observation and other optical observations, an electrical means (e.g., a motor 188) is connected to the pivotal shaft 167 provided to the dark field illumination unit 153 to remote-control the dark field illumination unit 153.

The microscope body 150 and the bright field system projection tube 151 and the lens barrel sleeve 154 can be integrally formed.

A microscope illuminating apparatus according to the twelfth embodiment of the present invention will be described with reference to FIGS. 21A and 21B. Note that the same portions as in the eleventh embodiment are denoted by the same reference numerals, and a detailed description thereof is omitted.

As shown in FIGS. 21A and 21B, the microscope illuminating apparatus according to the twelfth embodiment has a slider 190 between a bright field system projection tube 151 and a lamphouse 162.

The slider 190 extends in a direction perpendicular to the optical axis, and is supported on a slider support member 191 to be slidable in a direction perpendicular to the optical axis. This slidable movement can be easily performed by pushing or pulling a control 192, provided at the end portion of the slider 190, in a direction perpendicular to the optical axis. The slider 190 is held at a predetermined position by a click 193 provided in the slider support member 191.

The slider 190 has a total reflection mirror 165 and a filter box 194. A hole portion 195 for transmitting the illumination light from the lamphouse 162 therethrough is formed between the total reflection mirror 165 and the filter box 194.

The total reflection mirror 165 is disposed at an angle of 45° with respect to the optical axis of the illumination light irradiated on the total reflection mirror 165. Filters 196 (e.g., a color temperature change filter or an ND filter) for imparting predetermined optical characteristics to the illumination light are detachably supported by predetermined notched grooves 197. Thus, a desired filter 196 can be arranged as required. An attachment 164 the same as that described above is fixed on the slider support member 191.

The slider support member 191 is provided by engaging portions 152 and 160 the same as those described above to be rotatable about the optical axis through 360°. Hence, the slider support member 191 can be set at a desired position by the control 192. As a result, operability of the microscope during observation is improved.

The operation of the microscope illuminating apparatus having the above slider 190 will be described with reference to FIGS. 18A, 20, 21A and 21B.

The slider 190 is moved through the control 192. The slider 190 is fixed by the click 193 to position the total reflection mirror on the optical axis. As a result, the illumination light from the lamphouse 162 is reflected by the total reflection mirror 165 and irradiated on a condenser lens 170. The illumination light irradiated on the condenser lens 170 is condensed on a joint portion 173 through the condenser lens 170.

The dark field illumination light condensed on the joint portion 173 is guided, through an optical fiber tube 175, to an annular light source section (i.e., an annular illuminating section) 176 (see FIGS. 18A and 20) detachably mounted in a bright/dark field revolver 158. The illumination light guided to the annular light source section 176 is irradiated on an annular condenser lens 187 through an annular lens 183 provided to oppose the annular light source section 176 to irradiate a specimen 182 on a stage 181 as the dark field illumination light.

The diffracted light reflected by the specimen 182 is irradiated on an imaging lens (not shown) by a bright-/dark field objective lens 180 through the bright/dark field revolver 158 and a half mirror 179. The dark field observation of the surface of the specimen 182 is performed through an eyepiece 156 by observing the image formed by the imaging lens.

The slider 190 is moved by the control 192. The slider 190 is fixed by the click 193 to position the hole portion 195 on the optical axis. As a result, the illumination light from the lamphouse 162 is irradiated on the bright field system projection tube 151 through the hole portion 195.

The illumination light imparted with a predetermined optical characteristics by the bright field system projection tube 151 is incident on the bright/dark field objective lens 180 through the half mirror 179 and irradiated on the specimen 182 on the stage 181 as the bright field system illumination light.

The light reflected by the specimen 182 is radiated on the imaging lens (not shown) through the bright/dark field objective lens 180, the bright/dark field revolver 158, and the half mirror 179. The bright field system observation for the surface of the specimen 182 is performed through the eyepiece 156 by observing the image formed by the imaging lens.

The slider 190 is moved through the control 192. The slider 190 is fixed by the click 193 to position the filter box 194 along the optical axis. As a result, the illumination light from the lamphouse 162 and imparted with the predetermined optical characteristic is irradiated on the specimen 182, and predetermined optical observation is performed.

With the microscope illuminating apparatus having the arrangement described above, a similar effect to that obtained in the eleventh embodiment can be obtained. In addition, since the filter box 194 is mounted on the slider 190, an auxiliary filter 196 other than the filter inserted in the illumination optical path of the reflected bright field system projection tube 151 can be additionally inserted in the illumination optical path, and switching among reflected dark field observation, reflected bright field system observations, and other optical observation can be performed within a short period of time by moving the slider 190.

A microscope illuminating apparatus according to the thirteenth embodiment of the present invention will be described with reference to FIG. 22. Note that the same portions as in the embodiments described above are denoted by the same reference numerals, and a detailed description thereof is omitted.

As shown in FIG. 22, a system microscope to which the microscope illuminating apparatus according to the thirteenth embodiment is applied has a bright field system projection tube 151 on the upper portion of a microscope body 150. A lens barrel sleeve 154 is optically connected to one end of the bright field system projection tube 150, and a lamphouse 162 is optically connected to the other end of the bright field system projection tube 150.

A dark field illumination unit 153 for dark field illumination is connected to the lower portion of the microscope body 150. The dark field illumination unit 153 is connected to a transmitting illumination lamphouse 201 incorporating a lamp 200. The lamphouse 201 is connected to a connection cord 202 for applying a voltage from a power supply circuit (not shown) in the microscope body 150 to the lamphouse 201.

A control 203 for adjusting the voltage applied to the lamphouse 201 is provided on the microscope body 150. An optical fiber tube 175 extends from the dark field illumination unit 153 to an annular light source section (i.e., an annular illuminating section) 176 through the microscope body 150.

The dark field illumination unit 153 is mounted by engaging portions 152 and 160 to be rotatable through 360° about an optical axis.

In the microscope illuminating apparatus having the above arrangement, reflected bright field system observation of a specimen 182 (see FIG. 20) is performed by the illumination light from the lamphouse 162 connected to the bright field system projection tube 151, and reflected dark field observation of the specimen 182 is performed by the illumination light from the transmitting illumination lamphouse 201.

As a result, the microscope illuminating apparatus of this embodiment can simultaneously or selectively perform reflected bright field observation and reflected dark field observation of the specimen 182. The quantity of illumination light from the lamphouse 201 can be adjusted to a desired value by changing the voltage applied to the transmitting illumination lamphouse 201 by the control 203. Thus, in surface testing of, e.g., an IC wafer, illumination light having a quantity of light in accordance with the mounting pattern can be irradiated. As a result, the testing precision and working performance of the testing can be improved. Note that in the microscope illuminating apparatus of this embodiment, since simultaneous microscopic observation of reflected bright field observation and reflected dark field observation can be performed by using a mirror incorporated in the dark field illumination unit 153, i.e., by using a total reflection mirror 165, the manufacturing cost can be suppressed.

A microscope illuminating apparatus according to the fourteenth embodiment of the present invention will be described with reference to FIG. 23. Note that the same portions as in the above embodiments are denoted by the same reference numerals, and a detailed description thereof is omitted.

Figure 23:
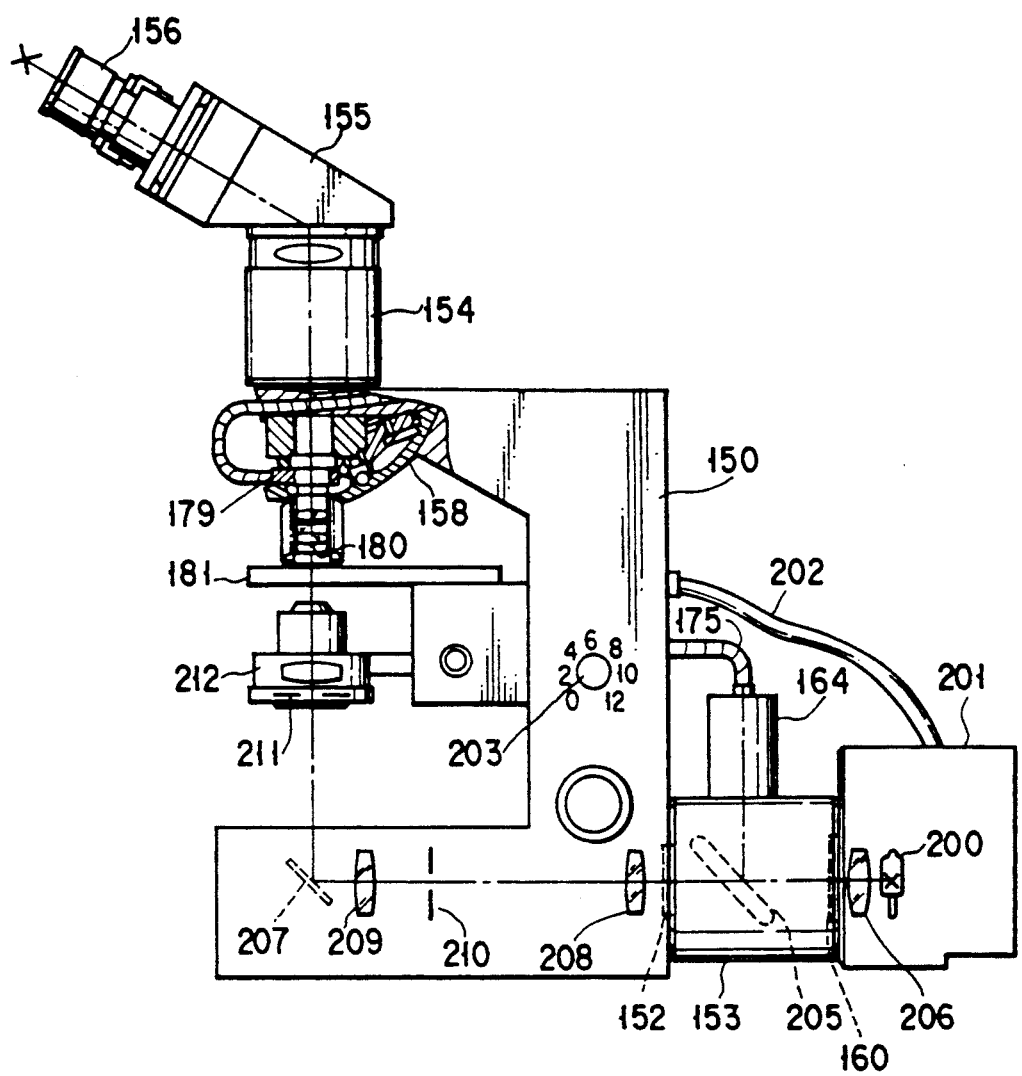
FIG. 23 schematically shows an arrangement of a system microscope to which a microscope illuminating apparatus according to the fourteenth embodiment of the present invention is applied.
Figure 24:
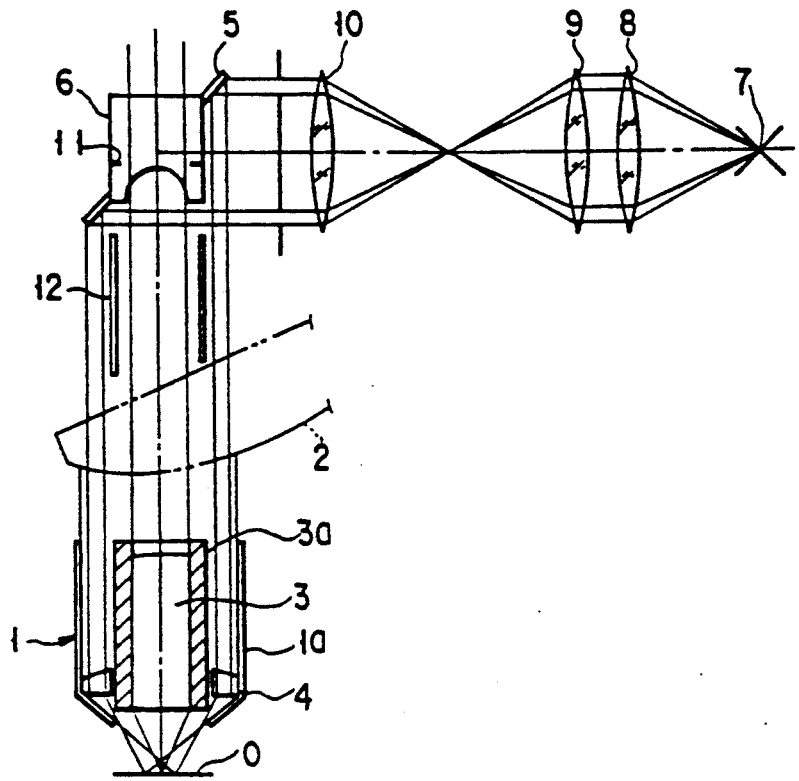
FIG. 24 shows an arrangement of a conventional microscope reflected illuminating apparatus.
Figure 25:
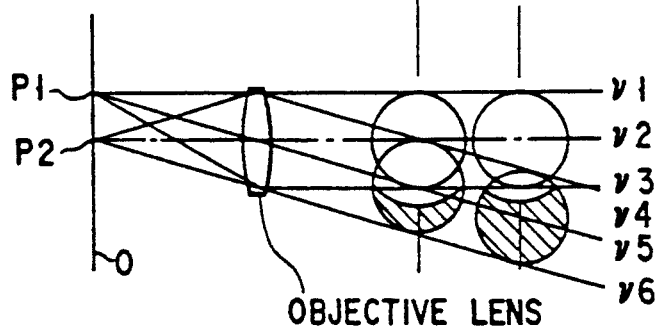
FIG. 25 explains a decrease in quantity of light corresponding to a stop position.

As shown in FIG. 23, a bright field system projection tube 151 is removed from a system microscope to which the microscope illuminating apparatus according to the fourteenth embodiment is applied. A dark field illumination unit 153, a transmitting illumination lamphouse 201, a connection cord 202, a control 203, and the like are provided to the lower portion of a microscope body 150 in the same manner as in the embodiments described above. The dark field illumination unit 153 incorporates a mirror 205 having a different transmittance. As a result, the illumination light generated by the lamp 200 is radiated on the mirror 200 through a collector lens 206. Part of the illumination light irradiated on the mirror 205 is reflected by the mirror 205 to be incident on an attachment 164. Another part of the illumination light is transmitted through the mirror 205 and is guided to the microscope body 150.

The microscope body 150 has a pair of lenses 208 and 209 for guiding the illumination light guided to the microscope body 150 to a reflecting mirror 207, a field stop 210, and an aperture stop 211.

As a result, the illumination light guided through the above optical system is focused on a specimen 182 (see FIG. 20) on a stage 181 through a condenser lens 212.

The lens 208 has a function of converting the parallel illumination light incident on it to Koehler illumination light.

The illumination light incident on the attachment 164 is guided to an annular light source section (i.e., an annular illuminating section) 179 through an optical fiber tube 175 and irradiated on the specimen 182 on the stage 181 through an annular condenser lens (see FIG. 20). As a result, transmission bright field system observation and reflected dark field observation of the specimen 182 can be simultaneously performed.

The dark field illumination unit 153 of this embodiment is mounted by engaging portions 152 and 160 identical to those described above to be rotatable through 360° about an optical axis.

In this embodiment, since the light source of the transmission illumination lamphouse 201 can be commonly used as the light source for dark system illumination, a low manufacturing cost can be achieved.

The present invention is not limited to the arrangements of the embodiments described above, and various changes and modifications can be made without departing from the spirit and scope of the invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A microscope illuminating apparatus comprising:
   an objective lens detachably mounted on a revolver of a system microscope in order to guide illumination light to irradiate an observation field, said objective lens having a lens system;
   a first light-shielding tube surrounding the lens system of said objective lens so as to separate an illumination optical path and an observation optical path from each other;
   an annular illuminating section provided within said revolver so as to face an open end of said illumination optical path;
   a second light-shielding tube arranged between said annular illuminating section and said first light-shielding member and in the vicinity of said first light-shielding member so as not to interfere with said objective lens during rotation of said revolver.

2. An apparatus according to claim 1, further comprising support means for supporting at least one of said first and second light-shielding tubes.

3. An apparatus according to claim 2, wherein said support means comprises a transparent member having an annular shape which is substantially the same as the shape of a cross section of said illumination optical path.

4. An apparatus according to claim 1, further comprising slit means removably arranged in said illumination optical path and having a plurality of slits extending radially along a meridional direction to shield light in a sagittal direction.

5. A microscope illuminating apparatus according to claim 1, further comprising:
   an illumination unit capable of being mounted on and detached from said system microscope and being connected optically to said objective lens and said annular illuminating section; and switching means capable of being mounted on and detached from said illumination unit for performing selective switching between bright field illumination and dark field illumination, wherein bright field system illumination light is condensed on the observation field through said objective lens or dark field illumination light is condensed on the observation field through said annular illuminating section by selectively switching said switching means.

6. An apparatus according to claim 5, further comprising light control means, provided in said illumination unit, for selectively adjusting a ratio in quantity of light of the bright field system illumination light to the dark field illumination light.

7. A microscope illuminating according to claim 1, further comprising:

condenser means detachably mounted on the system microscope for condensing illumination light on said observation field.

8. An apparatus according to claim 7, further comprising a condenser lens in said condenser means to condense bright field system illumination light on the observation field.

9. An apparatus according to claim 8, further comprising:

an illumination unit capable of being mounted on and detached from said system microscope and being connected optically to said condenser lens and said annular illuminating section; and switching means capable of being mounted on and detached from said illumination unit to perform selective switching between bright field illumination and dark field illumination, wherein bright field system illumination light is condensed on the observation field through said condenser lens or dark field illumination light is condensed on the observation field through said annular illuminating section by selectively switching said switching means.

10. An apparatus according to claim 9, further comprising light control means, provided in said illumination unit, for selectively adjusting a ratio in quantity of light of the bright field system illumination light to the dark field illumination light as required.

11. An apparatus according to claim 3, wherein said support means further comprises a plurality of non-transparent members, each non-transparent member having an arcuate shape, arranged in said illumination optical path and extending radially from an optical axis thereof.

* * * * *

UNITED STATES PATENT AND TRADEMARK OFFICE
CERTIFICATE OF CORRECTION

PATENT NO. : 5,325,231

DATED : June 28, 1994

INVENTOR(S) : TAMURA, Keisuke et al

It is certified that error appears in the above-indentified patent and that said Letters Patent is hereby corrected as shown below:

Title page, Item [75] Inventors, after "Kazuhiko Osa",

"Nineola" should be --Mineola--

Signed and Sealed this

Fifth Day of August, 1997

Attest:

BRUCE LEHMAN

Attesting Officer

Commissioner of Patents and Trademarks